(12) United States Patent
Yang et al.

(10) Patent No.: US 10,707,939 B2
(45) Date of Patent: Jul. 7, 2020

(54) CODEBOOK-BASED UPLINK TRANSMISSION IN WIRELESS COMMUNICATIONS

(71) Applicant: MediaTek Inc., Hsinchu (TW)

(72) Inventors: Weidong Yang, San Diego, CA (US);
Tzu-Han Chou, San Jose, CA (US);
Chao-Cheng Su, Hsinchu (TW);
Lung-Sheng Tsai, Hsinchu (TW);
Bo-Si Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/149,339

(22) Filed: Oct. 2, 2018

(65) Prior Publication Data

US 2019/0103907 A1    Apr. 4, 2019

Related U.S. Application Data

(63) Continuation-in-part of application No. 16/136,215, filed on Sep. 19, 2018.
(Continued)

(51) Int. Cl.
*H04B 7/06* (2006.01)
*H04W 76/27* (2018.01)
(Continued)

(52) U.S. Cl.
CPC ......... *H04B 7/0639* (2013.01); *H04B 7/0404* (2013.01); *H04B 7/0456* (2013.01);
(Continued)

(58) Field of Classification Search
None
See application file for complete search history.

(56) References Cited

U.S. PATENT DOCUMENTS 6,728,720 B1 * 4/2004 Lenzie ..................... G06F 16/22
6,754,222 B1 * 6/2004 Joung ................... H04L 49/107
370/412
(Continued)

FOREIGN PATENT DOCUMENTS

CN    101651469 A    2/2010
CN    106160924 A    11/2016
(Continued)

OTHER PUBLICATIONS

State Intellectual Property Office of China, International Search Report and Written Opinion for International Patent Application No. PCT/CN2018/109347, dated Jan. 2, 2019.
(Continued)

*Primary Examiner* — Berhanu Tadese
(74) *Attorney, Agent, or Firm* — Han IP PLLC; Andy M. Han

(57) ABSTRACT

Various solutions with respect to codebook-based uplink transmission in wireless communications are described. A user equipment (UE) stores information with respect to a plurality of permutations with respect to a mapping between a plurality of sounding reference signal (SRS) resources and a plurality of antenna ports at the UE. The UE receives signaling from a network node of a wireless network. The signaling contains an index identifying a permutation among the plurality of permutations. The UE performs an uplink transmission of data to the network node using one or more SRS resources of the plurality of SRS resources and one or more antenna ports of the plurality of antenna ports according to the identified permutation.

19 Claims, 18 Drawing Sheets

Related U.S. Application Data

(60) Provisional application No. 62/567,424, filed on Oct. 3, 2017.

(51) Int. Cl.
*H04L 5/00* (2006.01)
*H04W 72/04* (2009.01)
*H04B 7/0456* (2017.01)
*H04L 25/03* (2006.01)
*H04B 7/0404* (2017.01)

(52) U.S. Cl.
CPC ........... *H04B 7/063* (2013.01); *H04L 5/0048* (2013.01); *H04L 5/0051* (2013.01); *H04L 25/03898* (2013.01); *H04W 72/0413* (2013.01); *H04W 76/27* (2018.02)

(56) References Cited

U.S. PATENT DOCUMENTS

| | | | |
|---|---|---|---|
| 8,638,874 B2* | 1/2014 | Heath, Jr. | C23C 14/04 375/285 |
| 9,281,881 B2* | 3/2016 | Onggosanusi | H04B 7/0469 |
| 9,301,316 B2* | 3/2016 | Moulsley | H04W 72/1278 |
| 9,379,788 B2* | 6/2016 | Clevorn | H04B 7/04 |
| 9,419,761 B2* | 8/2016 | Seo | H04L 5/0048 |
| 9,425,934 B2* | 8/2016 | Seo | H04L 1/06 |
| 9,503,231 B2* | 11/2016 | Gaal | H04L 5/0091 |
| 9,635,684 B2* | 4/2017 | Ko | H04W 76/14 |
| 9,699,738 B2* | 7/2017 | Ouchi | H04W 52/04 |
| 9,900,198 B2* | 2/2018 | Nam | H04L 27/2601 |
| 10,070,472 B2* | 9/2018 | Ko | H04W 76/14 |
| 10,193,600 B2* | 1/2019 | Faxer | H04B 7/0478 |
| 10,404,434 B2* | 9/2019 | Gao | H04L 1/1819 |
| 2008/0285667 A1* | 11/2008 | Mondal | H04B 7/0417 375/260 |
| 2009/0262856 A1 | 10/2009 | Onggosanusi et al. | |
| 2010/0034312 A1* | 2/2010 | Muharemovic | H04L 27/2613 375/267 |
| 2010/0174965 A1* | 7/2010 | Sutskover | H03M 13/114 714/752 |
| 2010/0215110 A1* | 8/2010 | Onggosanusi | H04B 7/0426 375/260 |
| 2011/0134902 A1* | 6/2011 | Ko | H04B 7/0434 370/344 |
| 2011/0142154 A1* | 6/2011 | Kyeong | H04B 7/0408 375/267 |
| 2011/0312353 A1* | 12/2011 | Banister | H04B 7/0691 455/500 |
| 2012/0039273 A1* | 2/2012 | Nam | H04L 5/0005 370/329 |
| 2012/0063494 A1* | 3/2012 | Frenne | H04B 7/0417 375/219 |
| 2012/0213261 A1* | 8/2012 | Sayana | H04L 5/0048 375/224 |
| 2013/0064315 A1* | 3/2013 | Heath, Jr. | C23C 14/04 375/260 |
| 2013/0163687 A1* | 6/2013 | Jing | H04B 7/0658 375/267 |
| 2013/0208604 A1* | 8/2013 | Lee | H04B 17/345 370/252 |
| 2013/0272151 A1* | 10/2013 | Thomas | H04W 24/02 370/252 |
| 2013/0301561 A1* | 11/2013 | Sartori | H04W 72/04 370/329 |
| 2014/0133447 A1* | 5/2014 | Moulsley | H04W 72/1278 370/329 |
| 2014/0254508 A1* | 9/2014 | Krishnamurthy | H04B 7/0417 370/329 |
| 2015/0063485 A1* | 3/2015 | Lee | H04B 7/0413 375/267 |
| 2015/0078279 A1* | 3/2015 | Ko | H04W 76/14 370/329 |
| 2015/0105025 A1* | 4/2015 | Zhang | H01Q 3/26 455/63.4 |
| 2015/0117350 A1* | 4/2015 | Seo | H04B 7/0417 370/329 |
| 2015/0124732 A1* | 5/2015 | Seo | H04L 5/0051 370/329 |
| 2015/0304994 A1* | 10/2015 | Kim | H04L 5/0048 370/280 |
| 2015/0358132 A1* | 12/2015 | Wallen | H04L 5/0023 370/329 |
| 2016/0056875 A1* | 2/2016 | Kang | H04B 7/0456 370/329 |
| 2016/0080052 A1* | 3/2016 | Li | H04B 7/0456 375/267 |
| 2016/0149622 A1* | 5/2016 | Ma | H04L 5/0026 370/329 |
| 2016/0149680 A1* | 5/2016 | Kang | H04B 7/0417 370/329 |
| 2016/0211895 A1* | 7/2016 | Onggosanusi | H04B 7/0404 |
| 2016/0269084 A1* | 9/2016 | Nam | H04B 7/0417 |
| 2016/0269157 A1 | 9/2016 | Soriago et al. | |
| 2017/0019942 A1* | 1/2017 | Ko | H04W 76/14 |
| 2017/0099090 A1* | 4/2017 | Liu | H04B 7/04 |
| 2017/0155434 A1* | 6/2017 | Kim | H04W 76/14 |
| 2017/0187433 A1* | 6/2017 | Khsiba | H04L 27/2649 |
| 2017/0214507 A1* | 7/2017 | Kang | H04B 7/065 |
| 2017/0245271 A1* | 8/2017 | Lee | H04L 5/0051 |
| 2017/0303241 A1* | 10/2017 | Yang | H04J 11/003 |
| 2017/0311296 A1* | 10/2017 | Onggosanusi | H04B 7/0413 |
| 2018/0042028 A1* | 2/2018 | Nam | H04B 7/024 |
| 2018/0062724 A1* | 3/2018 | Onggosanusi | H04B 7/0413 |
| 2018/0092073 A1* | 3/2018 | Nogami | H04W 72/1268 |
| 2018/0098234 A1* | 4/2018 | Kim | H04L 5/0057 |
| 2018/0160402 A1* | 6/2018 | Huang | H04W 72/085 |
| 2018/0183503 A1* | 6/2018 | Rahman | H04B 7/0486 |
| 2018/0192397 A1* | 7/2018 | Seo | H04W 72/02 |
| 2018/0198510 A1* | 7/2018 | Park | H04B 7/0632 |
| 2018/0262313 A1* | 9/2018 | Nam | H04L 5/005 |
| 2018/0279145 A1* | 9/2018 | Jung | H04W 36/0085 |
| 2018/0287682 A1* | 10/2018 | Kwak | H04B 7/0695 |
| 2018/0287757 A1* | 10/2018 | Onggosanusi | H04L 5/0053 |
| 2018/0316407 A1* | 11/2018 | Rahman | H04B 7/0617 |
| 2018/0331742 A1* | 11/2018 | Yum | H04B 7/0417 |
| 2018/0367193 A1* | 12/2018 | Tan | H04B 7/0456 |
| 2018/0367205 A1* | 12/2018 | Liu | H04B 7/0695 |
| 2018/0368083 A1* | 12/2018 | Yang | H04B 7/0486 |
| 2019/0053157 A1* | 2/2019 | Lin | H04W 72/048 |
| 2019/0053223 A1* | 2/2019 | Zhou | H04L 5/0048 |
| 2019/0059057 A1* | 2/2019 | Peng | H04W 52/262 |
| 2019/0081667 A1* | 3/2019 | Yang | H04B 7/0456 |
| 2019/0081668 A1* | 3/2019 | Yang | H04B 7/0456 |
| 2019/0081671 A1* | 3/2019 | Yang | H04B 7/0404 |
| 2019/0089432 A1* | 3/2019 | Yang | H04B 7/0486 |
| 2019/0097710 A1* | 3/2019 | Park | H04B 7/0478 |
| 2019/0103903 A1* | 4/2019 | Yang | H04B 7/0456 |
| 2019/0103907 A1* | 4/2019 | Yang | H04B 7/0639 |
| 2019/0115964 A1* | 4/2019 | Yum | H04B 17/24 |
| 2019/0140723 A1* | 5/2019 | Yum | H04B 7/0626 |
| 2019/0140729 A1* | 5/2019 | Zhang | H04B 7/063 |
| 2019/0149205 A1* | 5/2019 | Kim | H04B 7/04 375/267 |
| 2019/0149299 A1* | 5/2019 | Lee | H04L 5/0092 370/329 |
| 2019/0173534 A1* | 6/2019 | Kakishima | H04B 7/0404 |
| 2019/0174527 A1* | 6/2019 | Park | H04L 25/0224 |
| 2019/0181935 A1* | 6/2019 | Karjalainen | H01Q 3/24 |
| 2019/0181939 A1* | 6/2019 | Liu | H04B 7/0639 |
| 2019/0182001 A1* | 6/2019 | Lee | H04W 52/16 |
| 2019/0222349 A1* | 7/2019 | Gao | H04L 1/0027 |
| 2019/0273549 A1* | 9/2019 | Park | H04B 7/04 |

FOREIGN PATENT DOCUMENTS

| | | | | |
|---|---|---|---|---|
| EP | 1757702 | A1 | 2/2007 | |
| EP | 1757702 | A1 * | 2/2007 | ............ C12N 15/86 |
| EP | 3422624 | A1 * | 1/2019 | ............ H04W 72/12 |
| GB | 0014232 | * | 8/2000 | ......... H04Q 11/0478 |
| GB | 2355619 | B * | 3/2002 | ............ H04L 49/107 |

(56) References Cited

FOREIGN PATENT DOCUMENTS

| | | | |
|---|---|---|---|
| WO | WO-2017048107 A1 * | 3/2017 | ........... H04B 7/0626 |
| WO | WO-2018010162 A1 * | 1/2018 | ........... H04L 5/0053 |
| WO | WO-2018182381 A1 * | 10/2018 | ............. H04L 27/26 |
| WO | WO-2018229112 A1 * | 12/2018 | ........ H04W 72/0413 |
| WO | WO-2018231141 A1 * | 12/2018 | ........... H04L 5/0094 |
| WO | WO-2019004882 A1 * | 1/2019 | ........... H04B 7/0626 |
| WO | WO-2019068266 A1 * | 4/2019 | ............... H04L 5/00 |

OTHER PUBLICATIONS

Taiwan Intellectual Property Office, Office Action for Taiwan Patent Application No. 107134888, dated Dec. 9, 2019.

* cited by examiner

FIG. 13A

| Codeword Index | 1 | 2 | 3 | 4 | 5 | 6 | 7 | 8 |
|---|---|---|---|---|---|---|---|---|
| Parameters $\begin{bmatrix} k \\ i \\ j \\ n \end{bmatrix}$ | $\begin{bmatrix} 0 \\ 1 \\ 1 \\ 1 \end{bmatrix}$ | $\begin{bmatrix} 0 \\ 1 \\ 1 \\ 2 \end{bmatrix}$ | $\begin{bmatrix} 0 \\ 1 \\ 1 \\ 3 \end{bmatrix}$ | $\begin{bmatrix} 0 \\ 1 \\ 1 \\ 4 \end{bmatrix}$ | $\begin{bmatrix} 0 \\ 1 \\ 2 \\ 1 \end{bmatrix}$ | $\begin{bmatrix} 0 \\ 1 \\ 2 \\ 2 \end{bmatrix}$ | $\begin{bmatrix} 0 \\ 1 \\ 2 \\ 3 \end{bmatrix}$ | $\begin{bmatrix} 0 \\ 1 \\ 2 \\ 4 \end{bmatrix}$ |
| Codeword | $\begin{bmatrix} 0° \\ 0° \\ 0° \\ 0° \end{bmatrix}$ | $\begin{bmatrix} 0° \\ 0° \\ 90° \\ 90° \end{bmatrix}$ | $\begin{bmatrix} 0° \\ 0° \\ 180° \\ 180° \end{bmatrix}$ | $\begin{bmatrix} 0° \\ 0° \\ 270° \\ 270° \end{bmatrix}$ | $\begin{bmatrix} 0° \\ 0° \\ 0° \\ 180° \end{bmatrix}$ | $\begin{bmatrix} 0° \\ 0° \\ 90° \\ 270° \end{bmatrix}$ | $\begin{bmatrix} 0° \\ 0° \\ 180° \\ 0° \end{bmatrix}$ | $\begin{bmatrix} 0° \\ 0° \\ 270° \\ 90° \end{bmatrix}$ |
| Rel-10 UL 4Tx |  | × |  | × |  | × |  | × |
| Rel-8 DL 4Tx | × |  | × |  | × |  | × |  |
| Rel-15 DL 4Tx | × | × | × | × |  |  |  |  |

| Codeword Index | 9 | 10 | 11 | 12 | 13 | 14 | 15 | 16 |
|---|---|---|---|---|---|---|---|---|
| Parameters $\begin{bmatrix} k \\ i \\ j \\ n \end{bmatrix}$ | $\begin{bmatrix} 0 \\ 2 \\ 1 \\ 1 \end{bmatrix}$ | $\begin{bmatrix} 0 \\ 2 \\ 1 \\ 2 \end{bmatrix}$ | $\begin{bmatrix} 0 \\ 2 \\ 1 \\ 3 \end{bmatrix}$ | $\begin{bmatrix} 0 \\ 2 \\ 1 \\ 4 \end{bmatrix}$ | $\begin{bmatrix} 0 \\ 2 \\ 2 \\ 1 \end{bmatrix}$ | $\begin{bmatrix} 0 \\ 2 \\ 2 \\ 2 \end{bmatrix}$ | $\begin{bmatrix} 0 \\ 2 \\ 2 \\ 3 \end{bmatrix}$ | $\begin{bmatrix} 0 \\ 2 \\ 2 \\ 4 \end{bmatrix}$ |
| Codeword | $\begin{bmatrix} 0° \\ 180° \\ 0° \\ 0° \end{bmatrix}$ | $\begin{bmatrix} 0° \\ 180° \\ 90° \\ 90° \end{bmatrix}$ | $\begin{bmatrix} 0° \\ 180° \\ 180° \\ 180° \end{bmatrix}$ | $\begin{bmatrix} 0° \\ 180° \\ 270° \\ 270° \end{bmatrix}$ | $\begin{bmatrix} 0° \\ 180° \\ 0° \\ 180° \end{bmatrix}$ | $\begin{bmatrix} 0° \\ 180° \\ 90° \\ 270° \end{bmatrix}$ | $\begin{bmatrix} 0° \\ 180° \\ 180° \\ 0° \end{bmatrix}$ | $\begin{bmatrix} 0° \\ 180° \\ 270° \\ 90° \end{bmatrix}$ |
| Rel-10 UL 4Tx | × |  |  | × | × |  |  | × |
| Rel-8 DL 4Tx | × |  | × |  |  |  |  |  |
| Rel-15 DL 4Tx |  |  |  |  | × | × | × | × |

| Codeword Index | 17 | 18 | 19 | 20 | 21 | 22 | 23 | 24 |
|---|---|---|---|---|---|---|---|---|
| Parameters $\begin{bmatrix} k \\ i \\ j \\ n \end{bmatrix}$ | $\begin{bmatrix} 1 \\ 1 \\ 1 \\ 1 \end{bmatrix}$ | $\begin{bmatrix} 1 \\ 1 \\ 1 \\ 2 \end{bmatrix}$ | $\begin{bmatrix} 1 \\ 1 \\ 1 \\ 3 \end{bmatrix}$ | $\begin{bmatrix} 1 \\ 1 \\ 1 \\ 4 \end{bmatrix}$ | $\begin{bmatrix} 1 \\ 1 \\ 2 \\ 1 \end{bmatrix}$ | $\begin{bmatrix} 1 \\ 1 \\ 2 \\ 2 \end{bmatrix}$ | $\begin{bmatrix} 1 \\ 1 \\ 2 \\ 3 \end{bmatrix}$ | $\begin{bmatrix} 1 \\ 1 \\ 2 \\ 4 \end{bmatrix}$ |
| Codeword | $\begin{bmatrix} 0° \\ 45° \\ 0° \\ 45° \end{bmatrix}$ | $\begin{bmatrix} 0° \\ 45° \\ 90° \\ 135° \end{bmatrix}$ | $\begin{bmatrix} 0° \\ 45° \\ 180° \\ 225° \end{bmatrix}$ | $\begin{bmatrix} 0° \\ 45° \\ 270° \\ 315° \end{bmatrix}$ | $\begin{bmatrix} 0° \\ 45° \\ 0° \\ 225° \end{bmatrix}$ | $\begin{bmatrix} 0° \\ 45° \\ 90° \\ 315° \end{bmatrix}$ | $\begin{bmatrix} 0° \\ 45° \\ 180° \\ 45° \end{bmatrix}$ | $\begin{bmatrix} 0° \\ 45° \\ 270° \\ 135° \end{bmatrix}$ |
| Rel-10 UL 4Tx |  |  |  |  |  |  |  |  |
| Rel-8 DL 4Tx |  | × |  |  |  |  |  |  |
| Rel-15 DL 4Tx | × | × | × | × |  |  |  |  |

| Codeword Index | 25 | 26 | 27 | 28 | 29 | 30 | 31 | 32 |
|---|---|---|---|---|---|---|---|---|
| Parameters $\begin{bmatrix} k \\ i \\ j \\ n \end{bmatrix}$ | $\begin{bmatrix} 1 \\ 2 \\ 1 \\ 1 \end{bmatrix}$ | $\begin{bmatrix} 1 \\ 2 \\ 1 \\ 2 \end{bmatrix}$ | $\begin{bmatrix} 1 \\ 2 \\ 1 \\ 3 \end{bmatrix}$ | $\begin{bmatrix} 1 \\ 2 \\ 1 \\ 4 \end{bmatrix}$ | $\begin{bmatrix} 1 \\ 2 \\ 2 \\ 1 \end{bmatrix}$ | $\begin{bmatrix} 1 \\ 2 \\ 2 \\ 2 \end{bmatrix}$ | $\begin{bmatrix} 1 \\ 2 \\ 2 \\ 3 \end{bmatrix}$ | $\begin{bmatrix} 1 \\ 2 \\ 2 \\ 4 \end{bmatrix}$ |
| Codeword | $\begin{bmatrix} 0° \\ 225° \\ 0° \\ 45° \end{bmatrix}$ | $\begin{bmatrix} 0° \\ 225° \\ 90° \\ 135° \end{bmatrix}$ | $\begin{bmatrix} 0° \\ 225° \\ 180° \\ 225° \end{bmatrix}$ | $\begin{bmatrix} 0° \\ 225° \\ 270° \\ 315° \end{bmatrix}$ | $\begin{bmatrix} 0° \\ 225° \\ 0° \\ 225° \end{bmatrix}$ | $\begin{bmatrix} 0° \\ 225° \\ 90° \\ 315° \end{bmatrix}$ | $\begin{bmatrix} 0° \\ 225° \\ 180° \\ 45° \end{bmatrix}$ | $\begin{bmatrix} 0° \\ 225° \\ 270° \\ 135° \end{bmatrix}$ |
| Rel-10 UL 4Tx |  |  |  |  |  |  |  |  |
| Rel-8 DL 4Tx |  |  |  |  |  | × |  |  |
| Rel-15 DL 4Tx |  |  |  |  |  | × | × | × |

FIG. 13A

| Codeword Index | 33 | 34 | 35 | 36 | 37 | 38 | 39 | 40 |
|---|---|---|---|---|---|---|---|---|
| Parameters [k, i, j, n] | 2,1,1,1 | 2,1,1,2 | 2,1,1,3 | 2,1,1,4 | 2,1,2,1 | 2,1,2,2 | 2,1,2,3 | 2,1,2,4 |
| Codeword | 0°, 90°, 0°, 90° | 0°, 90°, 90°, 180° | 0°, 90°, 180°, 270° | 0°, 90°, 270°, 0° | 0°, 90°, 0°, 270° | 0°, 90°, 90°, 0° | 0°, 90°, 180°, 90° | 0°, 90°, 270°, 180° |
| Rel-10 UL 4Tx | | × | | | × | | | × |
| Rel-8 DL 4Tx | × | | × | | | | | |
| Rel-15 DL 4Tx | × | × | × | × | | | | |

| Codeword Index | 41 | 42 | 43 | 44 | 45 | 46 | 47 | 48 |
|---|---|---|---|---|---|---|---|---|
| Parameters [k, i, j, n] | 2,2,1,1 | 2,2,1,2 | 2,2,1,3 | 2,2,1,4 | 2,2,2,1 | 2,2,2,2 | 2,2,2,3 | 2,2,2,4 |
| Codeword | 0°, 270°, 0°, 90° | 0°, 270°, 90°, 180° | 0°, 270°, 180°, 270° | 0°, 270°, 270°, 0° | 0°, 270°, 0°, 270° | 0°, 270°, 90°, 0° | 0°, 270°, 180°, 90° | 0°, 270°, 270°, 180° |
| Rel-10 UL 4Tx | | × | | × | | | × | |
| Rel-8 DL 4Tx | | | | | × | | × | |
| Rel-15 DL 4Tx | | | | × | × | × | × | × |

| Codeword Index | 49 | 50 | 51 | 52 | 53 | 54 | 55 | 56 |
|---|---|---|---|---|---|---|---|---|
| Parameters [k, i, j, n] | 3,1,1,1 | 3,1,1,2 | 3,1,1,3 | 3,1,1,4 | 3,1,2,1 | 3,1,2,2 | 3,1,2,3 | 3,1,2,4 |
| Codeword | 0°, 135°, 0°, 135° | 0°, 135°, 90°, 225° | 0°, 135°, 180°, 315° | 0°, 135°, 270°, 45° | 0°, 135°, 0°, 315° | 0°, 135°, 90°, 45° | 0°, 135°, 180°, 135° | 0°, 135°, 270°, 225° |
| Rel-10 UL 4Tx | | | | | | | | |
| Rel-8 DL 4Tx | | | | × | | | | |
| Rel-15 DL 4Tx | × | × | × | × | | | | |

| Codeword Index | 57 | 58 | 59 | 60 | 61 | 62 | 63 | 64 |
|---|---|---|---|---|---|---|---|---|
| Parameters [k, i, j, n] | 3,2,1,1 | 3,2,1,2 | 3,2,1,3 | 3,2,1,4 | 3,2,2,1 | 3,2,2,2 | 3,2,2,3 | 3,2,2,4 |
| Codeword | 0°, 315°, 0°, 135° | 0°, 315°, 90°, 225° | 0°, 315°, 180°, 315° | 0°, 315°, 270°, 45° | 0°, 315°, 0°, 315° | 0°, 315°, 90°, 45° | 0°, 315°, 180°, 135° | 0°, 315°, 270°, 225° |
| Rel-10 UL 4Tx | | | | | | | | |
| Rel-8 DL 4Tx | | | | | | | | × |
| Rel-15 DL 4Tx | | | | | × | × | × | × |

FIG. 13B

| Codeword Index | 1 | 2 | 3 | 4 |
|---|---|---|---|---|
| Parameters $\begin{bmatrix} p \\ k \\ i_{2,1} \\ i_{2,2} \end{bmatrix}$ | $\begin{bmatrix} 1 \\ 0 \\ 0 \\ 0 \end{bmatrix}$ | $\begin{bmatrix} 1 \\ 0 \\ 0 \\ 1 \end{bmatrix}$ | $\begin{bmatrix} 1 \\ 0 \\ 1 \\ 0 \end{bmatrix}$ | $\begin{bmatrix} 1 \\ 0 \\ 1 \\ 1 \end{bmatrix}$ |
| Codeword | $\begin{bmatrix} 0° & 0° \\ 0° & 0° \\ 0° & 180° \\ 0° & 180° \end{bmatrix}$ | $\begin{bmatrix} 0° & 0° \\ 0° & 180° \\ 0° & 180° \\ 0° & 0° \end{bmatrix}$ | $\begin{bmatrix} 0° & 0° \\ 0° & 0° \\ 0° & 180° \\ 180° & 0° \end{bmatrix}$ | $\begin{bmatrix} 0° & 0° \\ 0° & 180° \\ 0° & 180° \\ 180° & 180° \end{bmatrix}$ |
| Rel-8 DL 4Tx | × | × | × |  |
| Rel-15 DL 4Tx | × | × |  | × |
| Rel-10 UL 4Tx | × | × | × | × |

| Codeword Index | 5 | 6 | 7 | 8 |
|---|---|---|---|---|
| Parameters $\begin{bmatrix} p \\ k \\ i_{2,1} \\ i_{2,2} \end{bmatrix}$ | $\begin{bmatrix} 1 \\ 1 \\ 0 \\ 0 \end{bmatrix}$ | $\begin{bmatrix} 1 \\ 1 \\ 0 \\ 1 \end{bmatrix}$ | $\begin{bmatrix} 1 \\ 1 \\ 1 \\ 0 \end{bmatrix}$ | $\begin{bmatrix} 1 \\ 1 \\ 1 \\ 1 \end{bmatrix}$ |
| Codeword | $\begin{bmatrix} 0° & 0° \\ 45° & 45° \\ 0° & 180° \\ 45° & 225° \end{bmatrix}$ | $\begin{bmatrix} 0° & 0° \\ 45° & 225° \\ 0° & 180° \\ 45° & 45° \end{bmatrix}$ | $\begin{bmatrix} 0° & 0° \\ 45° & 45° \\ 0° & 180° \\ 225° & 45° \end{bmatrix}$ | $\begin{bmatrix} 0° & 0° \\ 45° & 225° \\ 0° & 180° \\ 225° & 225° \end{bmatrix}$ |
| Rel-8 DL 4Tx |  |  |  |  |
| Rel-15 DL 4Tx | × | × |  | × |
| Rel-10 UL 4Tx |  |  |  |  |

| Codeword Index | 9 | 10 | 11 | 12 |
|---|---|---|---|---|
| Parameters $\begin{bmatrix} p \\ k \\ i_{2,1} \\ i_{2,2} \end{bmatrix}$ | $\begin{bmatrix} 1 \\ 2 \\ 0 \\ 0 \end{bmatrix}$ | $\begin{bmatrix} 1 \\ 2 \\ 0 \\ 1 \end{bmatrix}$ | $\begin{bmatrix} 1 \\ 2 \\ 1 \\ 0 \end{bmatrix}$ | $\begin{bmatrix} 1 \\ 2 \\ 1 \\ 1 \end{bmatrix}$ |
| Codeword | $\begin{bmatrix} 0° & 0° \\ 90° & 90° \\ 0° & 180° \\ 90° & 270° \end{bmatrix}$ | $\begin{bmatrix} 0° & 0° \\ 90° & 270° \\ 0° & 180° \\ 90° & 90° \end{bmatrix}$ | $\begin{bmatrix} 0° & 0° \\ 90° & 90° \\ 0° & 180° \\ 270° & 90° \end{bmatrix}$ | $\begin{bmatrix} 0° & 0° \\ 90° & 270° \\ 0° & 180° \\ 270° & 270° \end{bmatrix}$ |
| Rel-8 DL 4Tx | × | × |  | × |
| Rel-15 DL 4Tx | × | × |  | × |
| Rel-10 UL 4Tx | × | × | × | × |

| Codeword Index | 13 | 14 | 15 | 16 |
|---|---|---|---|---|
| Parameters $\begin{bmatrix} p \\ k \\ i_{2,1} \\ i_{2,2} \end{bmatrix}$ | $\begin{bmatrix} 1 \\ 3 \\ 0 \\ 0 \end{bmatrix}$ | $\begin{bmatrix} 1 \\ 3 \\ 0 \\ 1 \end{bmatrix}$ | $\begin{bmatrix} 1 \\ 3 \\ 1 \\ 0 \end{bmatrix}$ | $\begin{bmatrix} 1 \\ 3 \\ 1 \\ 1 \end{bmatrix}$ |
| Codeword | $\begin{bmatrix} 0° & 0° \\ 135° & 135° \\ 0° & 180° \\ 135° & 315° \end{bmatrix}$ | $\begin{bmatrix} 0° & 0° \\ 135° & 315° \\ 0° & 180° \\ 135° & 135° \end{bmatrix}$ | $\begin{bmatrix} 0° & 0° \\ 135° & 135° \\ 0° & 180° \\ 315° & 135° \end{bmatrix}$ | $\begin{bmatrix} 0° & 0° \\ 135° & 315° \\ 0° & 180° \\ 315° & 315° \end{bmatrix}$ |
| Rel-8 DL 4Tx |  |  |  |  |
| Rel-15 DL 4Tx | × | × |  | × |
| Rel-10 UL 4Tx |  |  |  |  |

FIG. 14A

| Codeword Index | 17 | 18 | 19 | 20 |
|---|---|---|---|---|
| Parameters $\begin{bmatrix} p \\ k \\ i_{2,1} \\ i_{2,2} \end{bmatrix}$ | $\begin{bmatrix} 1 \\ 4 \\ 0 \\ 0 \end{bmatrix}$ | $\begin{bmatrix} 1 \\ 4 \\ 0 \\ 1 \end{bmatrix}$ | $\begin{bmatrix} 1 \\ 4 \\ 1 \\ 0 \end{bmatrix}$ | $\begin{bmatrix} 1 \\ 4 \\ 1 \\ 1 \end{bmatrix}$ |
| Codeword | $\begin{bmatrix} 0° & 0° \\ 180° & 180° \\ 0° & 180° \\ 180° & 0° \end{bmatrix}$ | $\begin{bmatrix} 0° & 0° \\ 180° & 0° \\ 0° & 180° \\ 180° & 180° \end{bmatrix}$ | $\begin{bmatrix} 0° & 0° \\ 180° & 180° \\ 0° & 180° \\ 0° & 180° \end{bmatrix}$ | $\begin{bmatrix} 0° & 0° \\ 180° & 0° \\ 0° & 180° \\ 0° & 0° \end{bmatrix}$ |
| Rel-8 DL 4Tx |  | × |  |  |
| Rel-15 DL 4Tx | × | × |  | × |
| Rel-10 UL 4Tx | × | × | × | × |

| Codeword Index | 21 | 22 | 23 | 24 |
|---|---|---|---|---|
| Parameters $\begin{bmatrix} p \\ k \\ i_{2,1} \\ i_{2,2} \end{bmatrix}$ | $\begin{bmatrix} 1 \\ 5 \\ 0 \\ 0 \end{bmatrix}$ | $\begin{bmatrix} 1 \\ 5 \\ 0 \\ 1 \end{bmatrix}$ | $\begin{bmatrix} 1 \\ 5 \\ 1 \\ 0 \end{bmatrix}$ | $\begin{bmatrix} 1 \\ 5 \\ 1 \\ 1 \end{bmatrix}$ |
| Codeword | $\begin{bmatrix} 0° & 0° \\ 225° & 225° \\ 0° & 180° \\ 225° & 45° \end{bmatrix}$ | $\begin{bmatrix} 0° & 0° \\ 225° & 45° \\ 0° & 180° \\ 225° & 225° \end{bmatrix}$ | $\begin{bmatrix} 0° & 0° \\ 225° & 225° \\ 0° & 180° \\ 45° & 225° \end{bmatrix}$ | $\begin{bmatrix} 0° & 0° \\ 225° & 45° \\ 0° & 180° \\ 45° & 45° \end{bmatrix}$ |
| Rel-8 DL 4Tx |  |  |  | × |
| Rel-15 DL 4Tx | × | × |  |  |
| Rel-10 UL 4Tx |  |  |  | × |

| Codeword Index | 25 | 26 | 27 | 28 |
|---|---|---|---|---|
| Parameters $\begin{bmatrix} p \\ k \\ i_{2,1} \\ i_{2,2} \end{bmatrix}$ | $\begin{bmatrix} 1 \\ 6 \\ 0 \\ 0 \end{bmatrix}$ | $\begin{bmatrix} 1 \\ 6 \\ 0 \\ 1 \end{bmatrix}$ | $\begin{bmatrix} 1 \\ 6 \\ 1 \\ 0 \end{bmatrix}$ | $\begin{bmatrix} 1 \\ 6 \\ 1 \\ 1 \end{bmatrix}$ |
| Codeword | $\begin{bmatrix} 0° & 0° \\ 270° & 270° \\ 0° & 180° \\ 270° & 90° \end{bmatrix}$ | $\begin{bmatrix} 0° & 0° \\ 270° & 90° \\ 0° & 180° \\ 270° & 270° \end{bmatrix}$ | $\begin{bmatrix} 0° & 0° \\ 270° & 270° \\ 0° & 180° \\ 90° & 270° \end{bmatrix}$ | $\begin{bmatrix} 0° & 0° \\ 270° & 90° \\ 0° & 180° \\ 90° & 90° \end{bmatrix}$ |
| Rel-8 DL 4Tx |  | × |  |  |
| Rel-15 DL 4Tx | × | × |  | × |
| Rel-10 UL 4Tx | × | × | × | × |

| Codeword Index | 29 | 30 | 31 | 32 |
|---|---|---|---|---|
| Parameters $\begin{bmatrix} p \\ k \\ i_{2,1} \\ i_{2,2} \end{bmatrix}$ | $\begin{bmatrix} 1 \\ 7 \\ 0 \\ 0 \end{bmatrix}$ | $\begin{bmatrix} 1 \\ 7 \\ 0 \\ 1 \end{bmatrix}$ | $\begin{bmatrix} 1 \\ 7 \\ 1 \\ 0 \end{bmatrix}$ | $\begin{bmatrix} 1 \\ 7 \\ 1 \\ 1 \end{bmatrix}$ |
| Codeword | $\begin{bmatrix} 0° & 0° \\ 315° & 315° \\ 0° & 180° \\ 315° & 135° \end{bmatrix}$ | $\begin{bmatrix} 0° & 0° \\ 315° & 135° \\ 0° & 180° \\ 315° & 315° \end{bmatrix}$ | $\begin{bmatrix} 0° & 0° \\ 315° & 315° \\ 0° & 180° \\ 135° & 315° \end{bmatrix}$ | $\begin{bmatrix} 0° & 0° \\ 315° & 135° \\ 0° & 180° \\ 135° & 135° \end{bmatrix}$ |
| Rel-8 DL 4Tx |  |  |  | × |
| Rel-15 DL 4Tx | × | × |  | × |
| Rel-10 UL 4Tx |  |  |  |  |

FIG. 14B

| Codeword Index | 33 | 34 | 35 | 36 |
|---|---|---|---|---|
| Parameters $\begin{bmatrix} p \\ k \\ i_{2,1} \\ i_{2,2} \end{bmatrix}$ | $\begin{bmatrix} 2 \\ 0 \\ 0 \\ 0 \end{bmatrix}$ | $\begin{bmatrix} 2 \\ 0 \\ 0 \\ 1 \end{bmatrix}$ | $\begin{bmatrix} 2 \\ 0 \\ 1 \\ 0 \end{bmatrix}$ | $\begin{bmatrix} 2 \\ 0 \\ 1 \\ 1 \end{bmatrix}$ |
| Codeword | $\begin{bmatrix} 0° & 0° \\ 0° & 180° \\ 0° & 0° \\ 0° & 180° \end{bmatrix}$ | $\begin{bmatrix} 0° & 0° \\ 0° & 180° \\ 0° & 180° \\ 0° & 0° \end{bmatrix}$ | $\begin{bmatrix} 0° & 0° \\ 0° & 180° \\ 0° & 0° \\ 180° & 0° \end{bmatrix}$ | $\begin{bmatrix} 0° & 0° \\ 0° & 180° \\ 0° & 180° \\ 180° & 180° \end{bmatrix}$ |
| Rel-8 DL 4Tx | × | × | × |  |
| Rel-15 DL 4Tx |  | × |  | × |
| Rel-10 UL 4Tx | × | × | × | × |

| Codeword Index | 37 | 38 | 39 | 40 |
|---|---|---|---|---|
| Parameters $\begin{bmatrix} p \\ k \\ i_{2,1} \\ i_{2,2} \end{bmatrix}$ | $\begin{bmatrix} 2 \\ 1 \\ 0 \\ 0 \end{bmatrix}$ | $\begin{bmatrix} 2 \\ 1 \\ 0 \\ 1 \end{bmatrix}$ | $\begin{bmatrix} 2 \\ 1 \\ 1 \\ 0 \end{bmatrix}$ | $\begin{bmatrix} 2 \\ 1 \\ 1 \\ 1 \end{bmatrix}$ |
| Codeword | $\begin{bmatrix} 0° & 0° \\ 0° & 180° \\ 45° & 45° \\ 45° & 225° \end{bmatrix}$ | $\begin{bmatrix} 0° & 0° \\ 0° & 180° \\ 45° & 225° \\ 45° & 45° \end{bmatrix}$ | $\begin{bmatrix} 0° & 0° \\ 0° & 180° \\ 45° & 45° \\ 225° & 45° \end{bmatrix}$ | $\begin{bmatrix} 0° & 0° \\ 0° & 180° \\ 45° & 225° \\ 225° & 225° \end{bmatrix}$ |
| Rel-8 DL 4Tx |  |  |  |  |
| Rel-15 DL 4Tx |  |  |  |  |
| Rel-10 UL 4Tx |  |  |  |  |

| Codeword Index | 41 | 42 | 43 | 44 |
|---|---|---|---|---|
| Parameters $\begin{bmatrix} p \\ k \\ i_{2,1} \\ i_{2,2} \end{bmatrix}$ | $\begin{bmatrix} 2 \\ 2 \\ 0 \\ 0 \end{bmatrix}$ | $\begin{bmatrix} 2 \\ 2 \\ 0 \\ 1 \end{bmatrix}$ | $\begin{bmatrix} 2 \\ 2 \\ 1 \\ 0 \end{bmatrix}$ | $\begin{bmatrix} 2 \\ 2 \\ 1 \\ 1 \end{bmatrix}$ |
| Codeword | $\begin{bmatrix} 0° & 0° \\ 0° & 180° \\ 90° & 90° \\ 90° & 270° \end{bmatrix}$ | $\begin{bmatrix} 0° & 0° \\ 0° & 180° \\ 90° & 270° \\ 90° & 90° \end{bmatrix}$ | $\begin{bmatrix} 0° & 0° \\ 0° & 180° \\ 90° & 90° \\ 270° & 90° \end{bmatrix}$ | $\begin{bmatrix} 0° & 0° \\ 0° & 180° \\ 90° & 270° \\ 270° & 270° \end{bmatrix}$ |
| Rel-8 DL 4Tx | × |  |  |  |
| Rel-15 DL 4Tx |  | × |  | × |
| Rel-10 UL 4Tx | × | × | × | × |

| Codeword Index | 45 | 46 | 47 | 48 |
|---|---|---|---|---|
| Parameters $\begin{bmatrix} p \\ k \\ i_{2,1} \\ i_{2,2} \end{bmatrix}$ | $\begin{bmatrix} 2 \\ 3 \\ 0 \\ 0 \end{bmatrix}$ | $\begin{bmatrix} 2 \\ 3 \\ 0 \\ 1 \end{bmatrix}$ | $\begin{bmatrix} 2 \\ 3 \\ 1 \\ 0 \end{bmatrix}$ | $\begin{bmatrix} 2 \\ 3 \\ 1 \\ 1 \end{bmatrix}$ |
| Codeword | $\begin{bmatrix} 0° & 0° \\ 0° & 180° \\ 135° & 135° \\ 135° & 315° \end{bmatrix}$ | $\begin{bmatrix} 0° & 0° \\ 0° & 180° \\ 135° & 315° \\ 135° & 135° \end{bmatrix}$ | $\begin{bmatrix} 0° & 0° \\ 0° & 180° \\ 135° & 135° \\ 315° & 135° \end{bmatrix}$ | $\begin{bmatrix} 0° & 0° \\ 0° & 180° \\ 135° & 315° \\ 315° & 315° \end{bmatrix}$ |
| Rel-8 DL 4Tx |  |  |  |  |
| Rel-15 DL 4Tx |  |  |  |  |
| Rel-10 UL 4Tx |  |  |  |  |

FIG. 14C

| Codeword Index | 49 | 50 | 51 | 52 |
|---|---|---|---|---|
| Parameters $\begin{bmatrix} p \\ k \\ i_{2,1} \\ i_{2,2} \end{bmatrix}$ | $\begin{bmatrix} 2 \\ 4 \\ 0 \\ 0 \end{bmatrix}$ | $\begin{bmatrix} 2 \\ 4 \\ 0 \\ 1 \end{bmatrix}$ | $\begin{bmatrix} 2 \\ 4 \\ 1 \\ 0 \end{bmatrix}$ | $\begin{bmatrix} 2 \\ 4 \\ 1 \\ 1 \end{bmatrix}$ |
| Codeword | $\begin{bmatrix} 0° & 0° \\ 0° & 180° \\ 180° & 180° \\ 180° & 0° \end{bmatrix}$ | $\begin{bmatrix} 0° & 0° \\ 0° & 180° \\ 180° & 0° \\ 180° & 180° \end{bmatrix}$ | $\begin{bmatrix} 0° & 0° \\ 0° & 180° \\ 180° & 180° \\ 0° & 180° \end{bmatrix}$ | $\begin{bmatrix} 0° & 0° \\ 0° & 180° \\ 180° & 0° \\ 0° & 0° \end{bmatrix}$ |
| Rel-8 DL 4Tx | ✓ |  | × |  |
| Rel-15 DL 4Tx |  | ✓ |  | × |
| Rel-10 UL 4Tx | × | × | ✓ | ✓ |

| Codeword Index | 53 | 54 | 55 | 56 |
|---|---|---|---|---|
| Parameters $\begin{bmatrix} p \\ k \\ i_{2,1} \\ i_{2,2} \end{bmatrix}$ | $\begin{bmatrix} 2 \\ 5 \\ 0 \\ 0 \end{bmatrix}$ | $\begin{bmatrix} 2 \\ 5 \\ 0 \\ 1 \end{bmatrix}$ | $\begin{bmatrix} 2 \\ 5 \\ 1 \\ 0 \end{bmatrix}$ | $\begin{bmatrix} 2 \\ 5 \\ 1 \\ 1 \end{bmatrix}$ |
| Codeword | $\begin{bmatrix} 0° & 0° \\ 0° & 180° \\ 225° & 225° \\ 225° & 45° \end{bmatrix}$ | $\begin{bmatrix} 0° & 0° \\ 0° & 180° \\ 225° & 45° \\ 225° & 225° \end{bmatrix}$ | $\begin{bmatrix} 0° & 0° \\ 0° & 180° \\ 225° & 225° \\ 45° & 225° \end{bmatrix}$ | $\begin{bmatrix} 0° & 0° \\ 0° & 180° \\ 225° & 45° \\ 45° & 45° \end{bmatrix}$ |
| Rel-8 DL 4Tx |  |  |  |  |
| Rel-15 DL 4Tx |  |  |  |  |
| Rel-10 UL 4Tx |  |  |  |  |

| Codeword Index | 57 | 58 | 59 | 60 |
|---|---|---|---|---|
| Parameters $\begin{bmatrix} p \\ k \\ i_{2,1} \\ i_{2,2} \end{bmatrix}$ | $\begin{bmatrix} 2 \\ 6 \\ 0 \\ 0 \end{bmatrix}$ | $\begin{bmatrix} 2 \\ 6 \\ 0 \\ 1 \end{bmatrix}$ | $\begin{bmatrix} 2 \\ 6 \\ 1 \\ 0 \end{bmatrix}$ | $\begin{bmatrix} 2 \\ 6 \\ 1 \\ 1 \end{bmatrix}$ |
| Codeword | $\begin{bmatrix} 0° & 0° \\ 0° & 180° \\ 270° & 270° \\ 270° & 90° \end{bmatrix}$ | $\begin{bmatrix} 0° & 0° \\ 0° & 180° \\ 270° & 90° \\ 270° & 270° \end{bmatrix}$ | $\begin{bmatrix} 0° & 0° \\ 0° & 180° \\ 270° & 270° \\ 90° & 270° \end{bmatrix}$ | $\begin{bmatrix} 0° & 0° \\ 0° & 180° \\ 270° & 90° \\ 90° & 90° \end{bmatrix}$ |
| Rel-8 DL 4Tx | × |  |  | × |
| Rel-15 DL 4Tx |  | ✓ |  | × |
| Rel-10 UL 4Tx | × | × | × | ✓ |

| Codeword Index | 61 | 62 | 63 | 64 |
|---|---|---|---|---|
| Parameters $\begin{bmatrix} p \\ k \\ i_{2,1} \\ i_{2,2} \end{bmatrix}$ | $\begin{bmatrix} 2 \\ 7 \\ 0 \\ 0 \end{bmatrix}$ | $\begin{bmatrix} 2 \\ 7 \\ 0 \\ 1 \end{bmatrix}$ | $\begin{bmatrix} 2 \\ 7 \\ 1 \\ 0 \end{bmatrix}$ | $\begin{bmatrix} 2 \\ 7 \\ 1 \\ 1 \end{bmatrix}$ |
| Codeword | $\begin{bmatrix} 0° & 0° \\ 0° & 180° \\ 315° & 315° \\ 315° & 135° \end{bmatrix}$ | $\begin{bmatrix} 0° & 0° \\ 0° & 180° \\ 315° & 135° \\ 315° & 315° \end{bmatrix}$ | $\begin{bmatrix} 0° & 0° \\ 0° & 180° \\ 315° & 315° \\ 135° & 315° \end{bmatrix}$ | $\begin{bmatrix} 0° & 0° \\ 0° & 180° \\ 315° & 135° \\ 135° & 135° \end{bmatrix}$ |
| Rel-8 DL 4Tx |  |  |  |  |
| Rel-15 DL 4Tx |  |  |  |  |
| Rel-10 UL 4Tx |  |  |  |  |

FIG. 14D

CODEBOOK-BASED UPLINK TRANSMISSION IN WIRELESS COMMUNICATIONS

CROSS REFERENCE TO RELATED PATENT APPLICATION(S)

The present disclosure is part of a non-provisional application claiming the priority benefit of U.S. Patent Application No. 62/567,424, filed on 3 Oct. 2017, and is also a continuation-in-part (CIP) of U.S. patent application Ser. No. 16/136,215, filed on 19 Sep. 2018, the contents of which are incorporated by reference in their entirety.

TECHNICAL FIELD

The present disclosure is generally related to wireless communications and, more particularly, to codebook-based uplink (UL) transmission in wireless communications.

BACKGROUND

Unless otherwise indicated herein, approaches described in this section are not prior art to the claims listed below and are not admitted as prior art by inclusion in this section.

Compared with downlink (DL) codebook design, there are significant differences in terms of network node implementation and deployment scenarios. Due to different gain set points, the issue of relative phase discontinuity (RPD) has been identified in Long-Term Evolution (LTE) mobile communication systems. With limited form factor, and given the immediate radiation/propagation environment is susceptible to effects such as hand-holding, rich local scatter and the like, possible antenna gain difference can also exist on the user equipment (UE) side. When multiple panels are used at a UE, there can be also the frequency coherence issue such as non-common mode phase noise. To complicate the situation even more, in $5^{th}$-Generation (5G) or New Radio (NR) mobile communication systems, both discrete Fourier transformation OFDM (DFT-OFDM) and cyclic-prefix orthogonal frequency-division multiplexing (CP-OFDM) waveforms are supported, and they have different requirements on the precoder in terms of peak-to-average power ratio (PAPR) preserving.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure proposes a number of solutions, schemes, methods and apparatus pertaining to codebook-based uplink transmission in wireless communications. Under various schemes proposed herein, a codebook may be designed to be robust for diverse scenarios. The codebook may cover a number of targeted codebooks which were optimized for specific antenna configurations and/or scenarios (e.g., Rel-8 DL 4Tx rank 2 codebook, rank 2 mutually unbiased bases (MUB) extension from Rel-10 UL 4Tx rank 1 codebook and Rel-15 DL NR 4Tx rank 2 codebook). It is believed that the proposed solutions, schemes, methods and apparatus may reduce transmission overhead, improve system performance, and reduce power consumption by UEs.

In one aspect, a method may involve a processor of a user equipment (UE) storing information with respect to a plurality of permutations with respect to a mapping between a plurality of sounding reference signal (SRS) resources and a plurality of antenna ports at the UE. The method may also involve the processor receiving signaling from a network node of a wireless network, with the signaling comprising an index identifying a permutation among the plurality of permutations. The method may further involve the processor performing an uplink transmission of data to the network node using one or more SRS resources of the plurality of SRS resources and one or more antenna ports of the plurality of antenna ports according to the identified permutation.

In one aspect, an apparatus may include a transceiver and a processor coupled to the transceiver. The transceiver may be capable of wirelessly communicating with a network node of a wireless network. The processor may be capable of: (a) storing, in a memory, information with respect to a plurality of permutations with respect to a mapping between a plurality of SRS resources and a plurality of antenna ports at the transceiver; (b) receiving, via the transceiver, signaling from a network node of a wireless network, with the signaling containing an index identifying a permutation among the plurality of permutations; and (c) performing, via the transceiver, an uplink transmission of data to the network node using one or more SRS resources of the plurality of SRS resources and one or more antenna ports of the plurality of antenna ports according to the identified permutation.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies wherever applicable such as, for example and without limitation, LTE, LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

Figure 1:
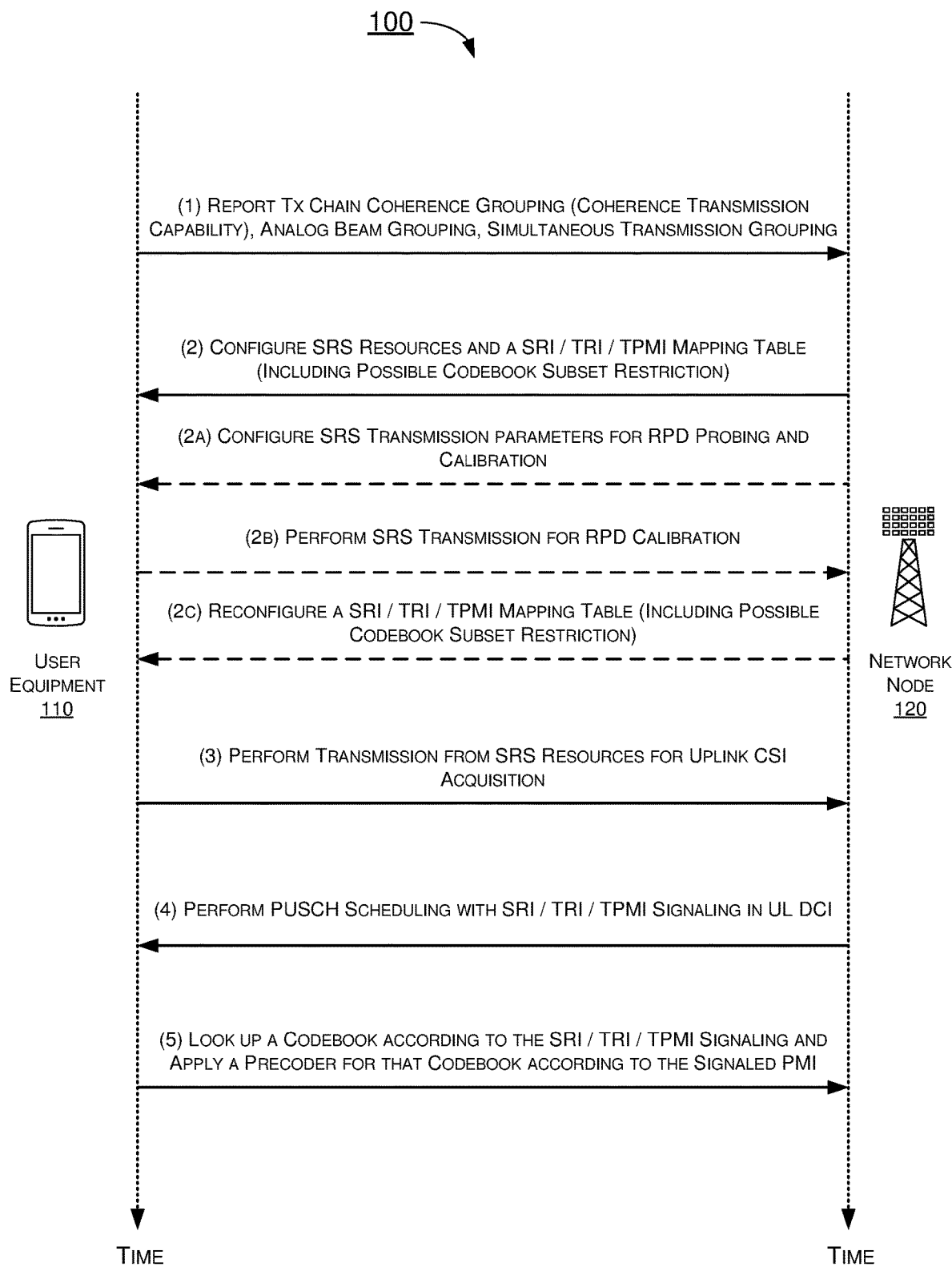
FIG. 1 is a diagram of an example message chain of a procedure for UL codebook-based transmission involving a UE and a network node in accordance with the present disclosure.

Each of FIG. 13A and FIG. 13B respectively shows a table of example rank 1 precoders in a codebook in accordance with an implementation of the present disclosure.

Each of FIG. 14A, FIG. 14B, FIG. 14C and FIG. 14D respectively shows a table of example rank 2 precoders in a codebook in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to codebook-based uplink transmission in wireless communications. According to the present disclosure, a number of possible solutions may be implemented separately or jointly. That is, although these possible solutions may be described below separately, two or more of these possible solutions may be implemented in one combination or another.

NR Uplink Codebook Design

As codebooks for NR need to support diverse radio environments and various UE practical issues, the present disclosure proposes a number of approaches and/or schemes, described below, to design rank 2 and higher-rank codebooks so the codebook subsumes LTE Rel-10 UL four-transmitter (4Tx) codebook and NR Rel-15 DL 4Tx codebook.

The chordal distance between two precoders A and B is given by the norm of the matrix $AA^H - BB^H$, where the subscript H is for the Hermitian operator. In the present disclosure, the phrase "chordal-distance equivalent" is used to refer to two codewords in an event that their chordal distance is 0. Additionally, a first codebook (codebook 1) may be deemed to "cover" a second codebook (codebook 2) in an event that, for any codeword in codebook 2, there is a chordal-distance equivalent codeword in codebook 1. Moreover, the phrase "chordal-distance equivalent" is used to refer to two codebooks in an event that, for any codeword in either of the two codebooks, there is a chordal-distance equivalent codeword in another codebook. In other words, they may cover each other.

Unified Codebook Design Supporting Diverse Scenarios

In 5G/NR mobile communications, diverse scenarios can be encountered in the application of the UL codebook, including RPD, non-common mode phase noise, antenna gain imbalance (AGI) and the like. It is desirable that a NR UL codebook can support these scenarios besides uniform linear array (ULA) and non-ULA antenna configurations. Specifically, the codebook may have all the codewords from LTE Rel-10 UL 4Tx codebook and NR Rel-15 DL 4Tx codebook.

Under a proposed scheme in accordance with the present disclosure, to support both ULA and non-ULA antenna configurations, a dual-stage codebook structure may be adopted, with a first construction ("Construction 1") or a second construction ("Construction 2"), as explained below.

For Construction 1, let $N_1=2$, with $N_2=1$, $O_1=4$ and $L=2$, the following may be defined:

$$\phi_n = e^{j\frac{\pi n}{2}},$$

$$u_m = \begin{bmatrix} 1 \\ e^{j\frac{2\pi n}{O_1 N_1}} \end{bmatrix}.$$

In the design:

$$\text{Let } B_n = \begin{bmatrix} u_n & u_{n+\frac{O_1 N_1}{2}} \end{bmatrix} \begin{bmatrix} 1 & \\ & e^{j\frac{2\pi n}{O_1 N_1}} \end{bmatrix} \begin{bmatrix} 1 & 1 \\ 1 & -1 \end{bmatrix}$$

$$\text{then } W_n^{(1)} = \begin{bmatrix} B_n & \\ & B_n \end{bmatrix}$$

$$\text{and } W_{i,j,n}^{(2)} = \begin{bmatrix} e_i \\ \phi_n e_j \end{bmatrix}.$$

A rank 1 precoder may be given by $W_k^{(1)} W_{i,j,n}^{(2)}$, where $0 \le k \le N_1 O_1/2 - 1 = 3$ with $1 \le i, j \le 2$ and $0 \le n \le 3$. It is noteworthy that $(i, j)=(1,1),(1,2),(2,1),(2,2)$, and $\phi_n$ takes a value from 1, j, -1, -j, and $e_i$ is a L×1 vector with 1 at element i and zeros elsewhere. It is also noteworthy that there are sixteen rank 1 precoders (with the first sixteen precoders in Rel-10 4Tx UL codebook being for port combining) from Rel-10 4Tx UL codebook, and thirty-two rank 1 precoders from Rel-15 NR downlink (DL) 4Tx codebook with L=1. Collecting those vectors together, forty unique precoders (eight precoders being common in both codebooks) may be obtained.

It is further noteworthy that the allowed range for each parameter can be restricted with CSR. To support the same port combining rank 1 precoders from Rel-10 UL 4Tx codebook, some CSRs may be considered. For instance, a beam group restriction of k=0, 2 (e.g., k≠1,3) may be taken, leading to one bit saving for signaling on $W_1$. Additionally, the allowed co-phasing values may depend on the beam selection pairs k=0 and k=2. For k=0, for beam selection (i, j)=(1,1) or (2,2), co-phasing values from {j,-j} are allowed; and for beam selection (i, j)=(1,2),(2,1), co-phasing values from {1,-1} are allowed. For k=2, for beam selection (i, j)=(1,2) or (2,1), co-phasing values from {j,-j} are allowed;

and for beam selection (i, j)=(1,1),(2,2), co-phasing values from {1,−1} are allowed. Accordingly, one bit saving can be achieved for signaling on $W_2$.

To support the same rank 1 precoders as from Rel-15 DL 4Tx codebook, the following CSBR may be taken: limiting beam selection (i, j) to (1,1),(2,2) (e.g., (1,2) and (2,1) are not allowed).

For Construction 2, let $N_1=2$, with $N_2=4$ and $L=4$ the following may be defined:

$$\phi_n = e^{j\frac{\pi n}{2}},$$

In the design:

$$\text{Let } B_n = \begin{bmatrix} u_n & u_{n+\frac{O_1 N_1}{4}} & u_{n+\frac{O_1 N_1 \cdot 2}{4}} & u_{n+\frac{O_1 N_1 \cdot 3}{4}} \end{bmatrix}$$

$$= \begin{bmatrix} 1 \\ e^{j\frac{2\pi n}{O_1 N_1}} \end{bmatrix} \begin{bmatrix} 1 & 1 & 1 & 1 \\ 1 & j & -1 & -j \end{bmatrix}$$

$$\text{then } W_n^{(1)} = \begin{bmatrix} B_n \\ & B_n \end{bmatrix}$$

$$\text{and } W_{i,j,n}^{(2)} = \begin{bmatrix} e_i \\ \phi_n e_j \end{bmatrix}.$$

Here, $e_i$ is a L×1 vector with 1 at element i and zeros elsewhere.

A rank 1 precoder may be given by:

$W_k^{(1)} W_{i,j,n}^{(2)}$, with $0 \leq k \leq N_1 O_1/4 - 1 = 1$, $0 \leq n \leq 3$ Here, (i, j)=(1,1),(2,2),(3,3),(4,4),(1,3),(3,1),(2,4),(4,2), and $\phi_n$ takes a value from 1, j, −1, −j. Hence, for beam selection there are eight choices, and quadrature phase-shift keying (QPSK) may be used for co-phasing.

Similar to the situation in Construction 1, CBSR may be also used to reduce signaling overhead and recover the NR DL 4Tx codebook and Rel-10 UL 4Tx codebook. To recover the Rel-10 UL 4Tx codebook, the first beam group (and no other beam group) is needed (e.g., k=0). For beam selection (1,1), (2,4), (3,3) and (4,2), co-phasing values may be limited to {j,−j}. For beam selection (1,3), (2,2), (3,1) and (4,4), co-phasing values may be limited to {1,−1}. To recover the NR DL 4Tx codebook, beam selection (i, j) may be limited to (1,1), (2,2), (3,3) and (4,4).

To support AGI, an approach of "one-antenna turn-off" and an approach of "two-antenna turn-off" may be considered. With respect to the one-antenna turn-off approach, one out of four antennas may be turned off. Starting with the sixteen rank 1 codewords from construction 1, then eight rank 1 codewords with 0 at port 1 may be obtained (e.g., by putting 0 at the first element), and eight rank 1 codewords with 0 at port 2 may be obtained (e.g., by putting 0 at the second element), and so on. In total, sixty-four rank 1 codewords may be obtained. It is noteworthy that, by setting 0 to the k elements in the sixteen rank 1 precoders from construction 1, sixteen codewords may be obtained, with eight of the sixteen codewords being unique.

With respect to the two-antenna turn-off approach, two out of four antennas may be turned off. There may be $$\binom{4}{2}$$

choices (e.g., the UE may turn off antennas 1 and 2, or antennas 1 and 3, and so on). When RPD or non-common phase noise are present, some combinations may not be necessary. For example, with coherence group composition of {(1, 2), (3, 4)}, port combining across coherence group may not be supported and, consequently, the UE may not support port combining such as antennas 2 and 4.

Under construction 3, three out of the four antennas may be turned off. There are four combinations. In the design:

$$\text{Let } B_n = \begin{bmatrix} u_n & u_{n+\frac{O_1 N_1}{2}} \end{bmatrix} = \begin{bmatrix} 1 \\ e^{j\frac{2\pi n}{O_1 N_1}} \end{bmatrix} \begin{bmatrix} 1 & 1 \\ 1 & -1 \end{bmatrix}$$

$$\text{then } W_n^{(1)} = \begin{bmatrix} B_n \\ & B_n \end{bmatrix} \text{ and } W_{i,j,n}^{(2)} = \begin{bmatrix} A_i \\ \phi_n A_j \end{bmatrix},$$

Here, $A_k$ is the k-th column of the following matrix:

$$A = \begin{bmatrix} [e_1] & [e_2] & \begin{bmatrix} 1/2 \\ 1/2 \end{bmatrix} & \begin{bmatrix} 1/2 \\ -1/2 \end{bmatrix} \end{bmatrix}$$

A rank 1 precoder may be given by $W_k^{(1)} W_{i,j,n}^{(2)}$, where $0 \leq k \leq N_1 O_1/2 - 1 = 3$, with $1 \leq i$, $j \leq 4$ and $0 \leq n \leq 3$.

To reduce signaling turn-off for a single antenna, constraints may be enforced (e.g., if i=3,4 and j=1,2, then n=0,1). Moreover, additional may be constructed as follows:

$$\tilde{W}_{i,0,0}^{(2)} = \begin{bmatrix} e_i \\ \begin{bmatrix} 0 \\ 0 \end{bmatrix} \end{bmatrix}, \text{ where } 1 \leq i \leq 4, \text{ and}$$

$$\tilde{W}_{0,j,0}^{(2)} = \begin{bmatrix} \begin{bmatrix} 0 \\ 0 \end{bmatrix} \\ e_j \end{bmatrix}, \text{ where } 1 \leq j \leq 4.$$

There may be a number of variations to the above scheme.

It is noteworthy that having $0 \leq k \leq N_1 O_1/2 - 1$ may be enough to cover all the precoders from NR 4Tx DL codebook and Rel-10 UL 4Tx codebook. Another approach leading to a clean design may be to separately define the precoders for the non-ULA and ULA antenna configurations, with precoders for other scenarios being under different beam groups (e.g., $N_1 O_1/2 \leq k \leq N_1 O_1 - 1$). It is also noteworthy that the co-phasing teams may be modified from 1, j, −1, −j to 1, $e^{j2\pi/3}$, $e^{j2\pi \cdot 2/3}$ to reduce the number of combinations.

It is noteworthy that $B_n$ may be defined as:

$$B_n = \begin{bmatrix} u_n & u_{n+\frac{O_1 N_1}{2}} \end{bmatrix} \begin{bmatrix} \begin{bmatrix} 1 \\ 0 \end{bmatrix} & \begin{bmatrix} 0 \\ 1 \end{bmatrix} \end{bmatrix}$$

As such, necessary changes may be made, with L=4 and A=[[$e_1$] [$e_2$] [$e_3$] [$e_4$]], and necessary changes may also be made to ranges and combinations of the indices.

Considering various scenarios and use cases, a resultant codebook may have a large size. A number of approaches may be taken to minimize, reduce or otherwise control the signaling overhead. For instance, all the precoders for the one-antenna turn-off case may be removed. Additionally, or alternatively, co-phasing for the two-antenna turn-off case may be limited to 1 and −1 for cross-coherence group cases (e.g., only [1 0 1 0] or [1 0 −1 0] is supported). Additionally, or alternatively, there may be no co-phasing for a three-antenna turn-off case. Additionally, or alternatively, conditional codebook usage may be considered. Specifically, with conditional codebook usage, the actual precoder used by the UE may be modified according to signaling of the base station/network node (e.g., gNB), which may be dynamic and/or semi-statical) over the codewords given in the specification (e.g., in TS 38.214).

Conditioned Codebook Usage

With conditioned codebook usage, the actual precoder used by a UE may be modified according to signaling from a base station (e.g., via dynamic and semi-statical signaling) over the codewords given in the specification (e.g., in TS 38.214). Under a proposed scheme in accordance with the present disclosure, when a base station (e.g., gNB) detects that one or more antenna ports from the UE is/are of low gain(s), the base station may signal to the UE semi-statically through RRC signaling or MAC CE, so that the UE would not use certain antenna(s). For instance, the base station may signal to the UE using a bitmap where each "0" in the bitmap indicates turn-off for the corresponding antenna port at the UE (e.g., a bitmap of [1 0 1 0] instructs the UE to turn off the second and the fourth antennas among four antennas at the UE). Accordingly, all the codebook design from Construction 1 described above may be reused. On the UE side, once the UE receives a precoding matrix indicator (PMI) from the base station, then some elements for the indicated precoder may be turned off according to the indication from the base station. Advantageously, dynamic signaling design and codebook design may be simplified. It is noteworthy that $W_1$ potentially may also be included in the semi-statical signaling/MAC CE.

Under a proposed scheme in accordance with the present disclosure, from the coherence group composition indicated by a UE, a base station may take measures such as SRS-based RPD calibration to see whether necessary remedy steps would be adequate to remove coherence group constraint pertaining to coherence transmission capability of antennas at the UE. As a base station may perform SRS calibration based on SRS, this may be expanded to demodulation reference signal (DMRS) from the UE. For instance, the base station may signal the same transmitted PMI (TPMI) for the UE and use different physical uplink shared channel (PUSCH) transmit power levels to calibrate RPD behavior of the UE. Considering the SRS/DMRS based on calibration results, the base station may indicate to the UE to use a precoder with phase rotation with respect to the precoder extracted from the SRS/DMRS transmission from the UE. In an event that the remedy steps at the base station are still not adequate or it is physically impossible for the base station to remedy the situation (e.g., non-common mode phase noise at the UE), then the base station may signal a codebook constraint to the UE. In this case, the meaning of the codebook (e.g., constructed from Construction 1 or Construction 2) may be modified.

In the case with two coherence groups, for $W_k^{(1)} W_{i,j,n}^{(2)}$, in Construction 1, if j=1, then: (1) the precoder may be for coherence group 1, (2) only elements 1 and 2 may be used for coherence group 1, and (3) the transmit power may be turned off for ports in coherence group 2. Otherwise, if j=2, then: (1) the precoder may be for coherence group 2, (2) only elements 3 and 4 may be used for coherence group 2, and (3) the transmit power may be turned off for ports in coherence group 1. In the case that antenna ports in a coherence group may come from non-adjacent indices (e.g., ports 1 and 3 in coherence group 1, and ports 2 and 4 in coherence group 2), a similar procedure may also be feasible.

Under the proposed scheme, re-indexing may be considered to allow arbitrary antenna-coherence group definitions. For instance, the precoder may be given an index as follows:

$$I(k,i,j,n) = k \cdot 2 \times 2 \times 4 + (i-1) \times 2 \times 4 + (j-1) \times 4 + n, \ 1 \le i, j \le 2, \ 0 \le n \le 3, \ 0 \le k \le 3.$$

Then, precoders with indices 0, 8, 16, 24, 32, 40, 48 and 56 may be used for port combination (1, 2), 1, 9, 17, 25, 33, 41, 49 and 57 for the port combination (, 3), and so on, with the understanding that the first two elements may be for the relevant antennas. For example, with index 9, the precoder $[1,-1, j]^T$ is specified, as it is associated with the port combination (1, 3), then 1 is applied to port 1, and −1 is applied to port 3, with ports 2 and 4 turned off.

It is noteworthy that it may not be necessary to enforce the constraints in the NR specification, if the base station can configure a bitmap for the addressable precoders for dynamic signaling. For example, even though there are more than 64 precoders under beam group k, the base station may configure a bitmap so the total addressable precoders are limited to no more than 64, then six bits for $W_2$ is possible.

Rank 2 Precoder Construction

Under a proposed scheme in accordance with the present disclosure, a rank 2 codebook structure may begin from NR as follows:

$$W = \frac{1}{\sqrt{4N_1 N_2}} \begin{bmatrix} W_{0,0} & W_{0,1} \\ W_{1,0} & W_{1,1} \end{bmatrix}.$$

Here, $W_{r,l} = b_{k_1+k'_{1,l}, k_2+k'_{2,l}} \times c_{r,l}$, r=0,1 l=0,1. Also, $c_{r,l}$ denotes co-phasing coefficients with $c_{0,l}=1$, $c_{1,0}=-c_{1,1}$, and $c_{1,0} \in \{1, j\}$, with $(k'_{1,1}, k'_{2,1}) \in \{(0,0), (O_1/2,0), (O_1,0), (O_1 \cdot 3/2,0)\}$.

Similar to the approach above for antenna turn-off and phase coherence groups, for DFT-OFDM waveforms, necessary modification may be applied to the rank 2 codewords thus obtained to derive PAPR preserving codewords. For example, the base station may provide to the UE a TPMI which may be mapped to a rank 2 codeword as follows (with unit amplitude for each element and phase in degrees):

$$\begin{bmatrix} 0 & 0 \\ 45 & 225 \\ 0 & 180 \\ 45 & 45 \end{bmatrix},$$

The, for DFT-OFDM waveforms, the UE may understand it as follows:

$$\begin{bmatrix} 0 & X \\ 45 & X \\ X & 180 \\ X & 45 \end{bmatrix},$$

Here, X denotes no transmission for the specified layer at the given antenna port. In the given example, the UE does not user ports 3 and 4 for layer 1, and the UE does not use ports 1 and 2 for layer 2. The modification mask (([1 X; 1

X; X 1 X 1] as used in this example) may be provided by the base station for all codewords or, alternatively, different modification masks may be used for codewords. It can be verified that most of the PAPR preserving rank 2 codewords from Rel-10 4Tx UL can be generated through applying a mask to the NR Rel-15 4Tx DL codewords at rank 2. Accordingly, the codebooks for different purposes may be embedded in a single codebook and the meaning taken at a UE may be modified according to the signaling from the base station (e.g., via RRC signaling and/or MAC CE). The applied precoder may be a result of dynamic signaling and semi-statical signaling, including possible CSR.

Besides the above designs and constructions, additional designs and constructions in accordance with the present disclosure are described below. It can be verified that Rel-8 DL 4Tx rank 2 codebook, the rank 2 mutually-unbiased bases (MUB) extension from Rel-10 UL 4Tx rank 1 codebook, and the Rel-1 5 DL NR 4Tx rank 2 codebook are completely covered by the designed codebook proposed by the present disclosure.

Rel-10 UL 4Tx codebook uses MUBs to construct rank 1 codewords, and different design principles and considerations were used to construct codewords for rank 2, rank 3 and rank 4. Under a proposed scheme in accordance with the present disclosure, rank 1 codewords according to Rel-1 0 UL 4Tx codebook can be used through the Householder transformation to construct rank 1, rank 2, rank 3 and rank 4 codewords.

Under the proposed scheme, development of a codebook for a 4Tx antenna configuration may start with five MUBs at dimension 4 as follows:

$$M_0 == \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \quad M_1 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix},$$

$$M_2 = \frac{1}{2}\begin{bmatrix} 1 & 1 & 1 & 1 \\ -1 & -1 & 1 & 1 \\ -j & j & j & -j \\ -j & j & -j & j \end{bmatrix}, \quad M_3 = \frac{1}{2}\begin{bmatrix} 1 & 1 & 1 & 1 \\ -j & -j & j & j \\ -j & j & j & -j \\ -1 & 1 & -1 & 1 \end{bmatrix},$$

$$M_4 = \frac{1}{2}\begin{bmatrix} 1 & 1 & 1 & 1 \\ -j & -j & j & j \\ -1 & 1 & -1 & 1 \\ -j & j & j & -j \end{bmatrix}$$

From MUB k, one vector $q_k$ may be chosen to construct a 4×4 precoder. For example, from $M_1$, the third vector may be chosen and may be denoted as follows:

$q_1 = \frac{1}{2}(1,-1,-1,1)^T$.

Under the proposed scheme, Householder transformation may be applied on $q_k$ to obtain the 4×4 precoder as follows:

$W^{(k)} = I_{4 \times 4} - 2q_k q_k^H / q_k^H q_k$.

Let $e_i$ be the 4×1 vector with zeros at all elements except element i, with the value at element i being 1. Then, four rank 1 precoders may be generated for MUB k as follows:

$W^{(k)} e_i$, i=1,2,3,4.

Additionally, six rank 2 precoders may be generated for MUB k as follows:

$W^{(k)}[e_i e_j]$, i,j=1,2,3,4, i≠j.

Under the proposed scheme, to minimize, reduce or otherwise control the signaling overhead, four out of the six precoders in the codebook may be chosen according to a chordal distance metric (e.g., choosing precoders with a chordal distance less than a predefined value). For example, the following chordal distance metric may be chosen: (i, j)=(1,2),(2,3),(3,4),(4,1). Accordingly, a chord distance profile for all rank 2 precoders constructed thereby from $M_1, \Lambda, M_4$ may compare favorably with (e.g., shorter than) that for the rank 2 precoders from Rel-8 DL 4Tx codebook.

Under the proposed scheme, four rank 3 precoders may be generated for MUB k as follows:

$W^{(k)}[e_i e_j e_l]$, (i,j,l)=(1,2,3),(1,2,4),(1,3,4),(2,3,4).

Assuming all four spatial layers are mapped to one transport block, one rank 4 precoder may be generated for MUB k as follows:

$W^{(k)}[e_1 \, e_2 \, e_3 \, e_4]$.

In an event that four spatial layers can be mapped to two transport blocks or NR codeword mapping can be further optimized in the future, then under the proposed scheme layer permutation as in Rel-8 4Tx codebook may also be considered.

In an event that $M_0$ is also included along with $M_1$ to $M_4$, then under the proposed scheme port selection precoders may also be included in the resulted codebook.

In an event that a dual-stage codebook is preferred (e.g., to achieve some commonality with the ULA-motivated component codebook as discussed below), then under the proposed scheme $W^{(k)}$ may take the role of $W_1$ and, additionally, $[e_i \Lambda e_j]$ may take the role of $W_2$.

There may be some benefit in aligning the NR 4Tx UL codebook with the LTE 4Tx UL codebook, at least for the common part. Specifically, the following may be verified: (a) $W^{(1)} e_i$, i=1,2,3,4 generate precoders 0,2,8,10 at rank 1 from Rel-10 4Tx UL codebook; (b) $W^{(2)} e_i$, i=1,2,3,4 generate precoders 1,3,9,11, at rank 1 from Rel-10 4Tx UL codebook; (c) $W^{(3)} e_i$, i=1,2,3,4 generate precoders 5,7,13,15 at rank 1 from Rel-10 4Tx UL codebook; and (d) $W^{(4)} e_i$, i=1,2,3,4 generate precoders 4,6,12,14 at rank 1 from Rel-10 4Tx UL codebook. Accordingly, the considered codebook design for ranks 1~4 may be considered as an extension from rank 1 precoders 0~15 of the Rel-10 4Tx UL codebook.

In an event that additional orthogonal bases besides the above four or five MUBs are used in codebook construction, then under the proposed scheme a larger codebook may be obtained. Enforcing a constraint of using the alphabet {1,−1, j,−j} and nothing else to construct vectors, there may be a total of sixty orthogonal bases over the four-dimension space. All the sixty orthogonal bases may be generated as described below.

Under the proposed scheme, firstly, four orthogonal bases (with each column thereof being for a respective vector) may be defined as follows:

$$P_1 = \begin{bmatrix} 1 & 1 & 1 & 1 \\ 1 & -1 & -1 & 1 \\ 1 & -1 & 1 & -1 \\ 1 & 1 & -1 & -1 \end{bmatrix}, \quad P_2 = \begin{bmatrix} 1 & 1 & 1 & 1 \\ 1 & -1 & -j & j \\ 1 & -1 & j & -j \\ 1 & 1 & -1 & -1 \end{bmatrix},$$

$$P_3 = \begin{bmatrix} 1 & 1 & 1 & 1 \\ 1 & -1 & -j & j \\ 1 & 1 & -1 & -1 \\ 1 & -1 & j & -j \end{bmatrix}, \quad P_4 = \begin{bmatrix} 1 & 1 & 1 & 1 \\ 1 & 1 & -1 & -1 \\ 1 & -1 & -j & j \\ 1 & -1 & j & -j \end{bmatrix}.$$

Then, each orthogonal basis with alphabet $\{1,-1, j,-j\}$ may be represented by a collection of column vectors as follows:

$$v_k = [v_{k,1}\ v_{k,2}\ v_{k,3}\ v_{k,4}], \text{ for } k=1,\Lambda,60.$$

It can be verified that all the column vectors $v_k$, $1 \leq k \leq 60$, may be obtained through the following:

$$v_k = \begin{bmatrix} r_{k,1} & & & \\ & r_{k,2} & & \\ & & r_{k,3} & \\ & & & r_{k,4} \end{bmatrix} p_{m_k},$$

with $r_{k,1},\Lambda, r_{k,4} \in \{1,-1, j,-j\}$, $1 \leq m_k \leq 4$.

Specifically, the four MUBs used previously may be expressed as follows:

$$M_1 = \begin{bmatrix} 1 & & & \\ & 1 & & \\ & & 1 & \\ & & & 1 \end{bmatrix} P_1, \quad M_2 = \begin{bmatrix} 1 & & & \\ & 1 & & \\ & & -j & \\ & & & j \end{bmatrix} P_1,$$

$$M_3 = \begin{bmatrix} 1 & & & \\ & -j & & \\ & & -j & \\ & & & -1 \end{bmatrix} P_1, \quad M_4 = \begin{bmatrix} 1 & & & \\ & -j & & \\ & & 1 & \\ & & & j \end{bmatrix} P_1.$$

Similar phase rotations may be applied to $P_1, \ldots, P_4$, for example, as follows:

$$M_5 = \begin{bmatrix} 1 & & & \\ & 1 & & \\ & & 1 & \\ & & & 1 \end{bmatrix} P_2, \quad M_6 = \begin{bmatrix} 1 & & & \\ & 1 & & \\ & & -j & \\ & & & j \end{bmatrix} P_2,$$

$$M_7 = \begin{bmatrix} 1 & & & \\ & -j & & \\ & & -j & \\ & & & -1 \end{bmatrix} P_2, \quad M_8 = \begin{bmatrix} 1 & & & \\ & -j & & \\ & & 1 & \\ & & & j \end{bmatrix} P_2.$$

Then, $M_1, \ldots, M_8$ may be used in the codebook construction.

Under a proposed scheme in accordance with the present disclosure, four vectors may be defined as follows:

$$v_1 = \begin{bmatrix} 1 \\ 1 \end{bmatrix}, \quad v_2 = \begin{bmatrix} 1 \\ -1 \end{bmatrix}, \quad v_3 = \begin{bmatrix} 1 \\ e^{j\pi/4} \end{bmatrix}, \quad v_4 = \begin{bmatrix} 1 \\ -e^{j\pi/4} \end{bmatrix}.$$

Under the proposed scheme, for a first approach (or "First Construction") a number of $C_2^{(2)}$, $k=1, 2,\Lambda,16$ matrices may be defined as follows:

1. eigh matrices $C_2^{(k)}$, $k=1,\Lambda, 8$, from $$\begin{bmatrix} v_{1+c} & v_{1+c} \\ v_{1+c} & -v_{1+c} \end{bmatrix}, \begin{bmatrix} v_{1+c} & v_{1+c} \\ v_{2+c} & -v_{2+c} \end{bmatrix}, \begin{bmatrix} v_{1+c} & v_{2+c} \\ \phi_1 v_{1+c} & -\phi_1 v_{2+c} \end{bmatrix},$$

where $c=0, 2$, $\phi_1=1, j$.

2. eight matrices $W_2^{(k)}$, $k=9,\Lambda,16$, from $$\begin{bmatrix} v_1 & v_1 \\ \phi_2 v_1 & \phi_2 v_2 \end{bmatrix}, \begin{bmatrix} v_1 & v_2 \\ \phi_2 v_2 & \phi_2 v_1 \end{bmatrix},$$

where $\phi_2=1, j, -1, -j$.

Here, a rank 2 precoder may be given by:

$$\frac{1}{\sqrt{D_n}}\begin{bmatrix} 1 & & & \\ & e^{j\pi/2 \cdot n} & & \\ & & 1 & \\ & & & e^{j\pi/2 \cdot n} \end{bmatrix} C_2^{(k)},$$

$n=0,1,2,3$, $k=1,2,\Lambda,16$.

Under the proposed scheme, for a second approach (or "Second Construction") another codebook, which is chordal-distance equivalent to the codebook above, may be defined as follows:

1. eight matrices from $$\begin{bmatrix} v_{1+c} & v_{1+c} \\ v_{1+c} & -v_{1+c} \end{bmatrix}, \begin{bmatrix} v_{1+c} & v_{1+c} \\ v_{2+c} & -v_{2+c} \end{bmatrix}, \begin{bmatrix} v_{1+c} & v_{2+c} \\ \phi_1 v_{1+c} & -\phi_1 v_{2+c} \end{bmatrix},$$

where $c=0, 2$, $\phi_1=1, j$.

2. eight matrices from $$\begin{bmatrix} v_3 & v_4 \\ \phi_2 v_3 & \phi_2 v_4 \end{bmatrix}, \begin{bmatrix} v_3 & v_4 \\ \phi_2 v_4 & \phi_2 v_3 \end{bmatrix},$$

where $\phi_2=1, j, -1, -j$.

Here, a rank 2 precoder may be given by:

$$\frac{1}{\sqrt{D_n}}\begin{bmatrix} 1 & & & \\ & e^{j\pi/2 \cdot n} & & \\ & & 1 & \\ & & & e^{j\pi/2 \cdot n} \end{bmatrix} C_2^{(k)},$$

$n=0,1,2,3$, $k=1,2,\Lambda,16$.

In general, a diagonal matrix R ($R=\text{diag}([1\ e^{j\theta}\ 1\ e^{j\theta}])$ for each $\theta$) may be multiplied from the left side to 8 matrices from (2) along with the 8 matrices in (1) above under the Second Construction to obtain another chordal-distance equivalent codebook with the First Construction.

Under the proposed scheme, for a third approach (or "Third Construction"), a codebook may be defined as follows:

1. four matrices $C_2^{(k)}$ from $$\begin{bmatrix} v_1 & v_1 \\ v_1 & -v_1 \end{bmatrix}, \begin{bmatrix} v_1 & v_1 \\ v_2 & -v_2 \end{bmatrix}, \begin{bmatrix} v_1 & v_2 \\ \phi_1 v_1 & -\phi_1 v_2 \end{bmatrix},$$

where $\phi_1=1, j$.

Here, a rank 2 precoder may be given by:

$$\begin{bmatrix} 1 & & & \\ & e^{j\pi/4 \cdot n} & & \\ & & 1 & \\ & & & e^{j\pi/4 \cdot n} \end{bmatrix} C_2^{(k)},$$
$$\underbrace{\phantom{xxxxxxxxxxxxxxxxxxxxxxxxxxxx}}_{D_n}$$

n=0,1,Λ,7, k=1,2,Λ,4 or any of the eight matrices from $$\begin{bmatrix} v_3 & v_4 \\ \phi_2 v_3 & \phi_2 v_4 \end{bmatrix}, \begin{bmatrix} v_3 & v_4 \\ \phi_2 v_4 & \phi_2 v_3 \end{bmatrix},$$

where $\phi_2$=1, j, −1, −j.
Alternatively, $$\begin{bmatrix} v_1 & v_2 \\ \phi_2 v_1 & \phi_2 v_2 \end{bmatrix}, \begin{bmatrix} v_1 & v_2 \\ \phi_2 v_2 & \phi_2 v_1 \end{bmatrix}$$

may be used in the construction, as codewords resulted from them are chordal-distance equivalent with codewords resulted from $$\begin{bmatrix} v_3 & v_4 \\ \phi_2 v_3 & \phi_2 v_4 \end{bmatrix}, \begin{bmatrix} v_3 & v_4 \\ \phi_2 v_4 & \phi_2 v_3 \end{bmatrix}.$$

It is noteworthy that, in all the constructions, some codewords may be taken out (e.g., not requiring to cover all codewords from an existing codebook). Moreover, additional codewords may be included. In the NR DL 4Tx codebook design, $$\begin{bmatrix} v_1 & v_1 \\ j v_1 & -j v_1 \end{bmatrix}$$

may be included along with $$\begin{bmatrix} v_1 & v_1 \\ v_1 & -v_1 \end{bmatrix},$$

even though they generate chordal-distance equivalent codewords. A similar practice may be adopted here and $C^{(k)}$ may include more matrices.

Under the proposed scheme, for a fourth approach (or "Fourth Construction"), a codebook construction may be pursued as an antenna port re-indexing. For that, permutation matrices may be introduced in the codebook construction. From a first codebook, such as a dual-stage codebook $W_1^{(k)} W_2^{(m)}$, where k is a generic index (e.g., k=($i_{1,1}, i_{1,2}, i_{1,3}$)) and m is a generic index (e.g., n=($i_2$, n)) as in TS 38.214 (v.0.1.2 September 2017), an enlarged codebook may be given by $P_{k_1} W_1^{(k)} W_2^{(m)}$, where $1 \le k_1 \le K$, and $P_{k_1}$ denotes a permutation matrix. One example is provided below.

With the NR DL 4Tx codebook with L=1, the following permutation matrices may be applied to the rank 2 precoder $W_1^{(k)} W_2^{(m)}$:

$$P_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$P_2 = \begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

$$P_3 = \begin{bmatrix} 0 & 0 & 1 & 0 \\ 0 & 0 & 0 & 1 \\ 0 & 1 & 0 & 0 \\ 1 & 0 & 0 & 0 \end{bmatrix},$$

$$P_4 = \begin{bmatrix} 0 & 1 & 0 & 0 \\ 0 & 0 & 1 & 0 \\ 0 & 0 & 0 & 1 \\ 1 & 0 & 0 & 0 \end{bmatrix}$$

In this case, a beam group may be determined by k and the permutation matrix index. For a UE, the permutation matrix index may be determined in a long-term basis (e.g., through radio resource control (RRC) signaling and/or media access control (MAC) control element (CE) as part of codebook subset restriction (CSR) or independent of CSR), so the feedback overhead of the enlarged codebook may remain unchanged compared to the original codebook (e.g., NR DL 4Tx codebook). With the above example, the Rel-8 rank 2 4Tx codebook and Rel-15 NR rank 2 4Tx codebook are covered by the proposed design.

It is noteworthy that, for other ranks, the same or different permutation matrices may be identified to enlarge the codebook. In summary, applying permutation matrices to an existing or a first codebook to obtain an enlarged or second codebook may be treated as a generic way to handle irregular antenna configuration. For First Construction, Second Construction and Third Construction described above, using rotations from the First Construction, Second Construction and Third Construction, a number of permutation matrices $P_{k_1}$ and $Q_{k_2}$ may be used to enlarge the codebook, such as $P_{k_1} D_n Q_{k_2} C_2^{(k)}$.

Each of FIG. 13A and FIG. 13B respectively shows a table of example rank 1 precoders in a codebook in accordance with an implementation of the present disclosure. Each of FIG. 14A, FIG. 14B, FIG. 14C and FIG. 14D respectively shows a table of example rank 2 precoders in a codebook in accordance with an implementation of the present disclosure.

Codebook-Based Transmission

Under a proposed scheme in accordance with the present disclosure, a procedure shown in FIG. 1 may be utilized in terms of coherence group configuration and the use of corresponding codebooks. FIG. 1 illustrates an example message chain of a procedure 100 for UL codebook-based transmission involving a UE 110 and a network node 120 in accordance with the present disclosure.

Referring to FIG. 1, at step (1) of procedure 100, UE 110 transmits a reporting to network node 120 about Tx-chain coherence grouping, analog beam grouping and simultaneous transmission grouping. At step (2) of procedure 100, network node 120 transmits signaling to UE 110 to configure SRS resources and an SRS resource indicator (SRI), transmitted rank indicator (TRI) and/or precoding matrix indicator (PMI) mapping table (including possible codebook subset restriction) at UE 110. Specifically, at step (2*a*), network node 120 may configure SRS transmission parameters for RPD probing and calibration. Additionally, at step (2*b*), UE 110 may perform SRS transmission to network node 120 for RPD calibration. Moreover, at step (2*c*), network node 120 may transmit signaling to UE 110 to reconfigure an SRI/TRI/TPMI mapping table (including possible codebook subset restriction). At step (3) of procedure 100, UE 110 may perform transmission from SRS resources for UL channel state information (CSI) acquisition. At step (4) of procedure 100, network node 120 may transmit signaling to UE 110 for PUSCH scheduling with SRI/TRI/TPMI signaling in an UL downlink control information (DCI). At step (5) of procedure 100, UE 110 may look up a codebook according to the SRI/TRI/TPMI signaling from network node 120, and UE 110 may apply a precoder for the codebook according to the signaled PMI.

Figure 2:
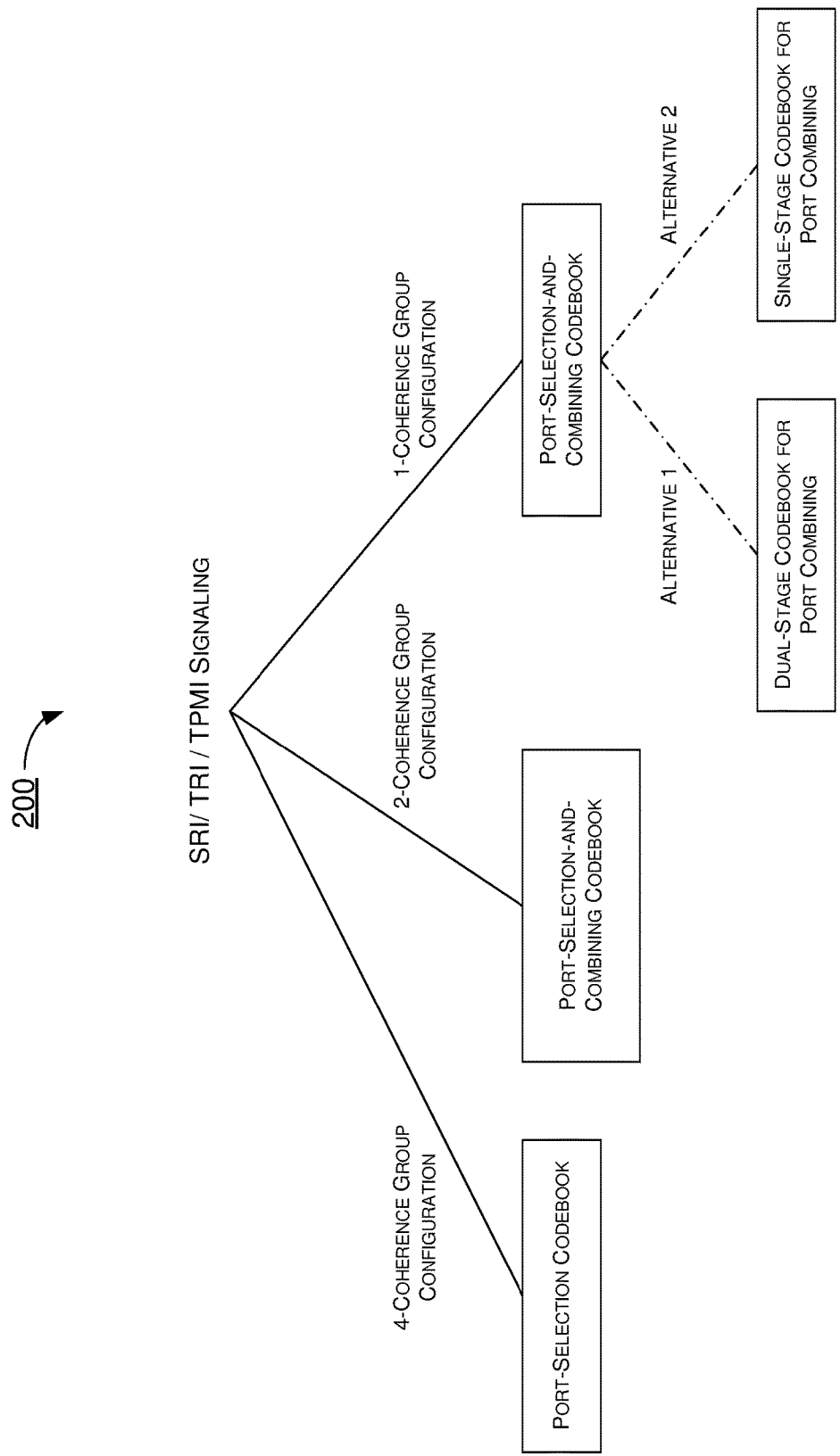
FIG. 2 is a diagram of an example concept in accordance with the present disclosure.

Under a proposed scheme in accordance with the present disclosure, there may be a number of options concerning the coherence group configuration and the usage of codebook(s). In a first option (option 1), the concept of coherence group may be used in the definition of a codebook, but the SRI/TRI/TPMI signaling design may support dynamically indicated selection of a codeword from any codebook. FIG. 2 illustrates an example concept 200 of option 1 in accordance with the present disclosure. In concept 200, the port-selection codebook and port-selection-and-combining codebook may be recursively constructed codebooks.

Figure 3:
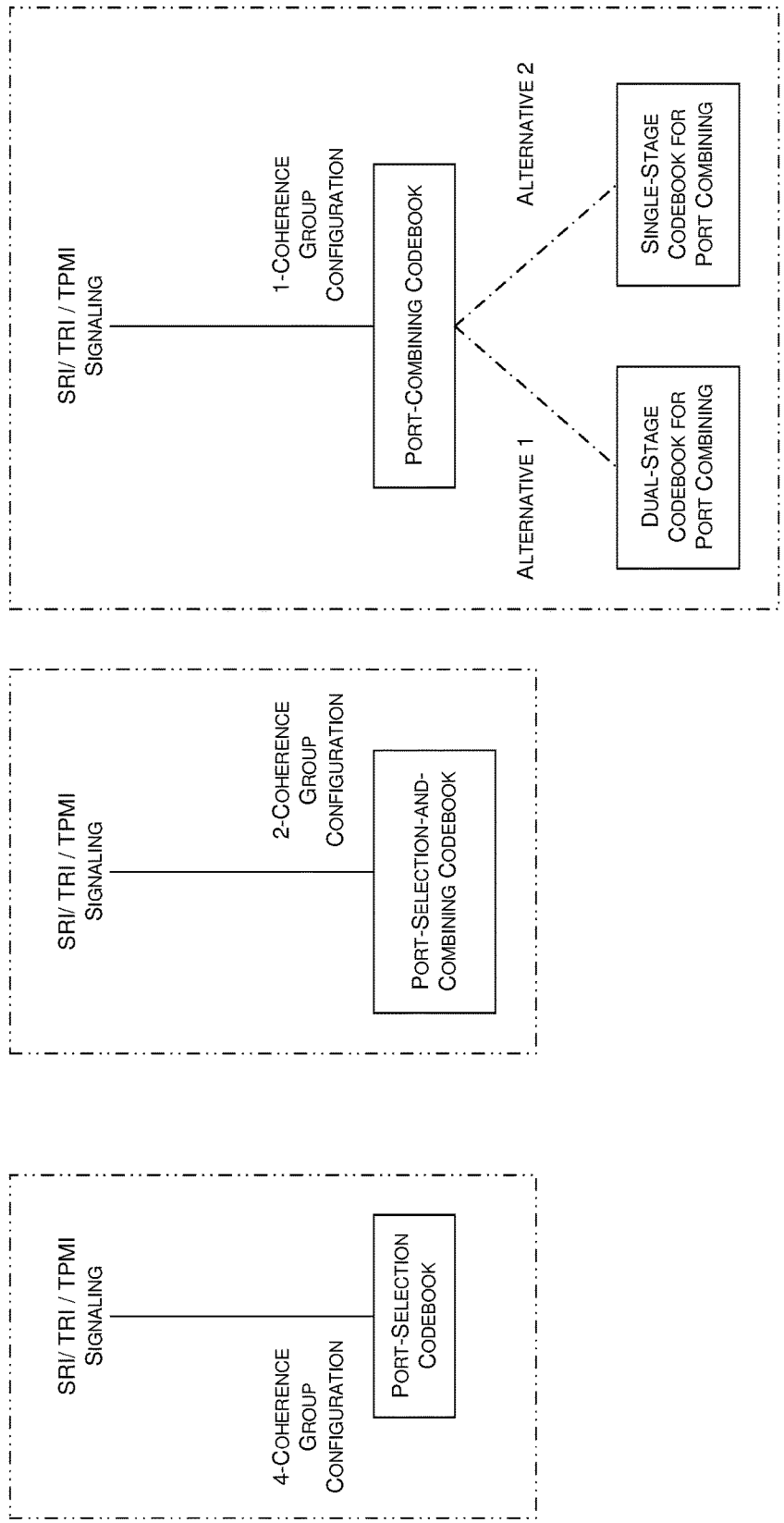
FIG. 3 is a diagram of an example concept in accordance with the present disclosure.

In a second option (option 2), a network node (e.g., gNB) may signal a coherence group configuration through RRC signaling or MAC CE to a UE. Moreover, dynamic signaling with an UL DCI may be used to select one or more codewords from a codebook specifically defined for that coherence group configuration. FIG. 3 illustrates an example concept 300 of option 2 in accordance with the present disclosure.

Figure 4:
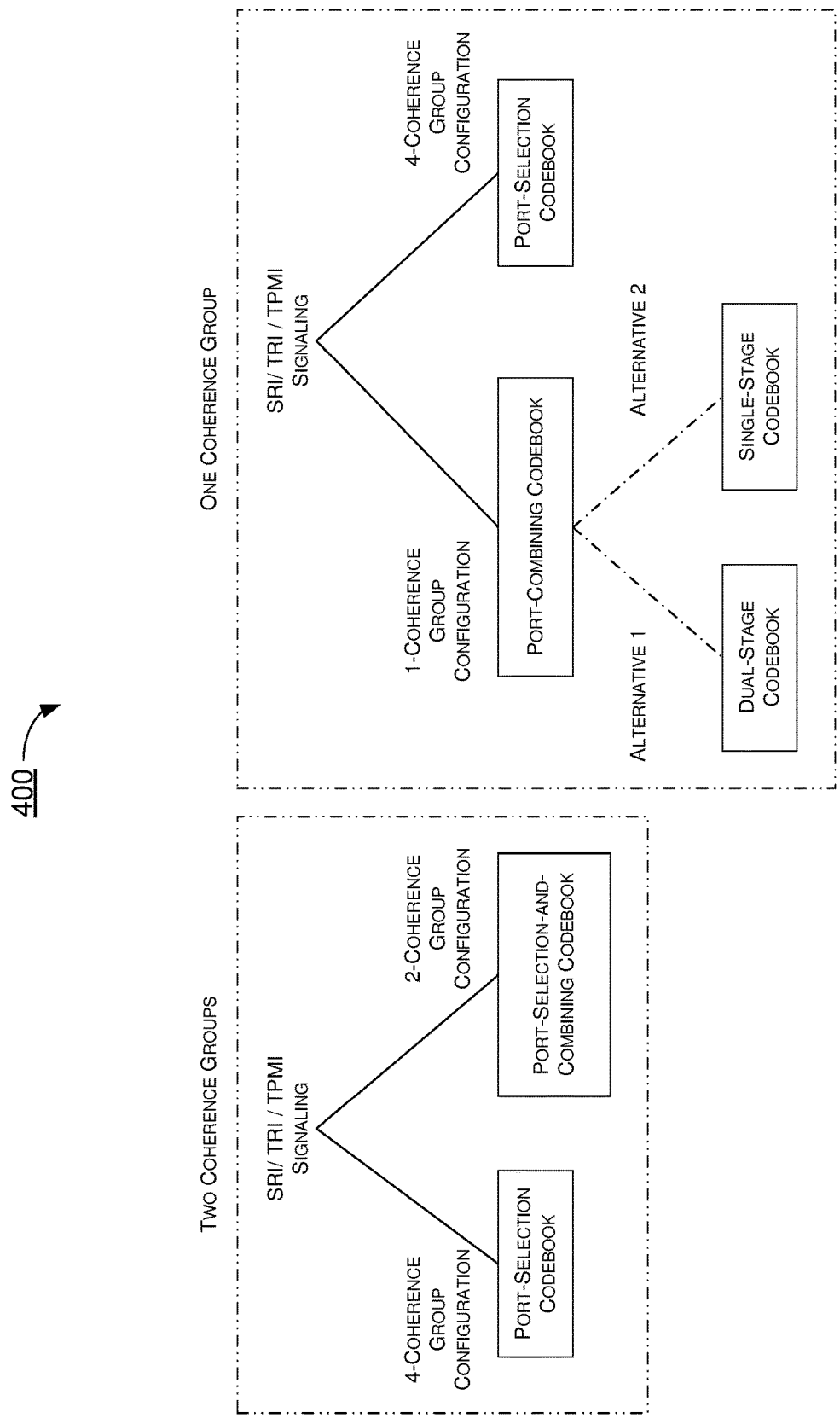
FIG. 4 is a diagram of an example concept in accordance with the present disclosure.

In a third option (option 3), a network node (e.g., gNB) may signal a coherence group configuration through RRC or MAC CE to a UE. As the number of codewords under the codebook with four coherence groups (port-selection codebook) may be limited, and the port-selection codebook may offer useful support for antenna gain imbalance (AGI), the codebook with four coherence groups may be supported with the case of two coherence group configuration and the case of one coherence group, respectively. FIG. 4 illustrates an example concept 400 of option 3 in accordance with the present disclosure. In concept 400, port-selection codebook may be used jointly with port-combining codebook or the recursively constructed codebook with two coherence groups. It is noteworthy that, with option 3 for a UE configured with one coherence group (e.g., from the perspective of the network the UE may be capable of phase coherence transmission from all four Tx chains), the network node may signal a codeword from the port-selection codebook or the port-combining codebook dynamically.

Accordingly, a precoder selection at a base station/network node (e.g., gNB) may not be constrained by the coherence group signaling from a UE (e.g., option 1 and option 3). The concept of coherence group may be used in the definition of a codebook, but the SRI/TRI/TPMI signaling design may support dynamically indicated selection of a codeword from any codebook. This may be important and beneficial in addressing UL transmission power issues.

Port Combining Uplink Codebook Design

In view of the above, it is desirable to have a codebook which supports both uniform linear array (ULA) and non-ULA antenna configurations. Specifically, a desirable 5G/NR UL codebook may cover all the codewords from LTE Rel-10 UL 4Tx codebook and NR Rel-15 DL 4Tx codebook.

Figure 5:
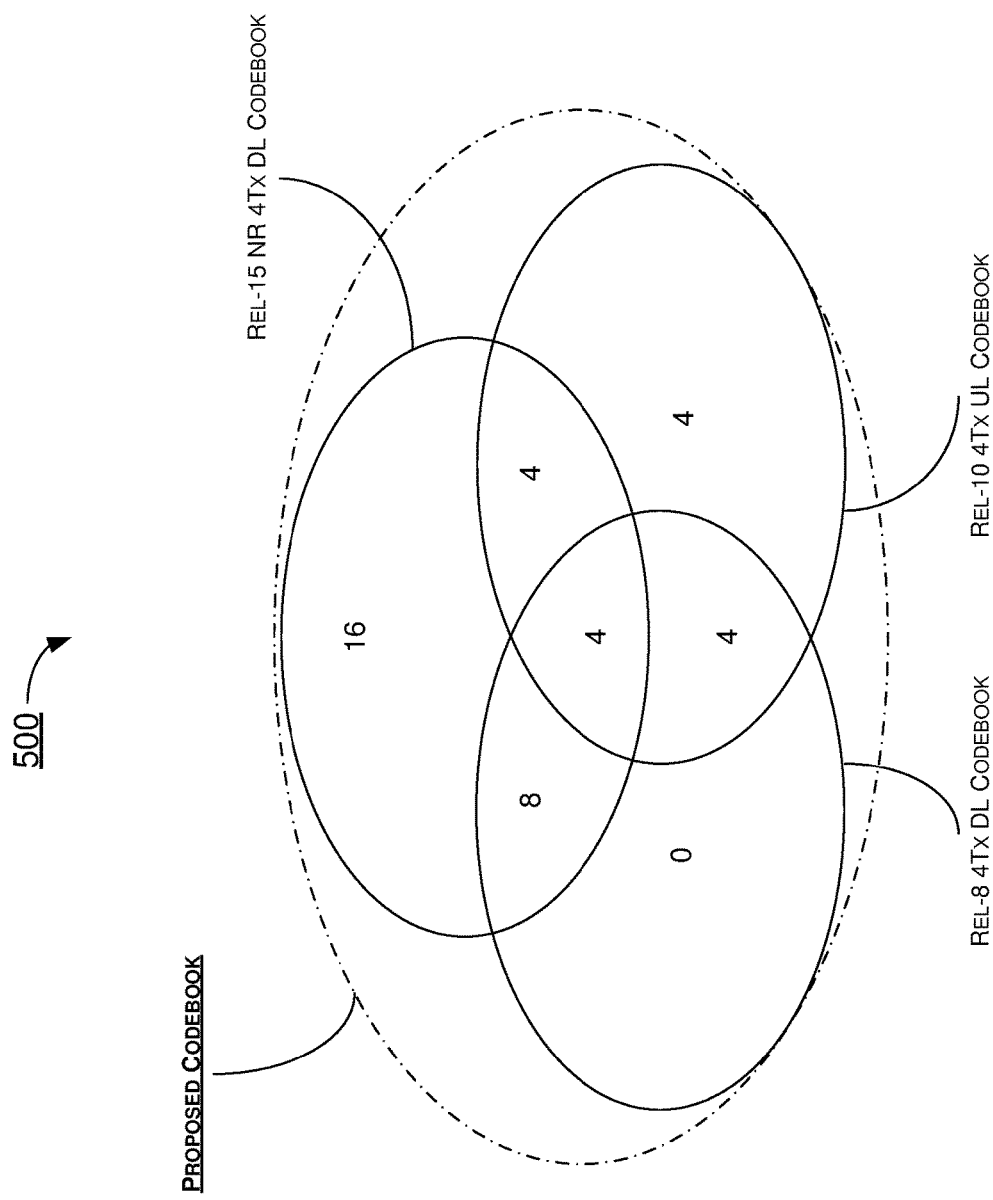
FIG. 5 is a diagram of a proposed rank 1 codebook design in accordance with the present disclosure.

FIG. 5 illustrates a proposed rank 1 codebook design 500 in accordance with the present disclosure. Referring to FIG. 5, the proposed rank 1 codebook design 500 may cover Rel-8 four-Tx DL codebook, Rel-10 four-Tx UL codebook and Rel-15 four-Tx DL codebook.

Under a proposed scheme in accordance with the present disclosure, a proposed NR rank 1 precoder may be defined with $N_1=2$, with $N_2=1$, $O_1=4$ and $L=2$. Accordingly, the following are defined:

$$\phi_n = e^{j\frac{\pi n}{2}},$$

$$u_m = \begin{bmatrix} 1 \\ e^{j\frac{2\pi m}{O_1 N_1}} \end{bmatrix}.$$

Let $B_n = \begin{bmatrix} u_n & u_{n+\frac{O_1 N_1}{2}} \end{bmatrix}$, and $W_n^{(1)} = \begin{bmatrix} B_n \\ & B_n \end{bmatrix}$, and $$W_{i,j,n}^{(2)} = \begin{bmatrix} e_i \\ \phi_n e_j \end{bmatrix}.$$

A rank 1 precoder may be given by:

$$\frac{1}{\sqrt{4}} W_k^{(1)} W_{i,j,n}^{(2)},$$

wherein $0 \leq k \leq N_1 O_1/2-1=3$, $1 \leq i, j \leq 2$ and $0 \leq n \leq 3$.

It is noteworthy that the allowed beam selections (i, j)=(1,1), (1,2), (2,1) or (2,2), and $\phi_n$ may take a value from 1, j, −1, −j. Here, $e_1$ is a L×1 vector with 1 at element i and zeros elsewhere. It is also noteworthy that there are 4Tx port combining 16 rank 1 precoders (the first 16 precoders in Rel-10 4Tx UL codebook are for port combining) from Rel-10 4Tx UL codebook, and 32 rank 1 precoders from Rel-15 NR DL 4Tx codebook with L=1. Collecting those vectors together, 40 unique precoders (with 8 precoders being common in both codebooks) may be obtained.

It is noteworthy that the allowed range for each parameter may be restricted with CSR.

To support the same 4Tx port combining rank 1 precoders from Rel-10 UL 4Tx codebook, some CSR may be taken. For instance, beam group restriction k=0,2 may be taken (e.g., k≠1,3), which may lead to one bit saving for signaling on $W_1$. Moreover, the allowed co-phasing values may depend on the beam selection pairs. For k=0, for beam selection (i, j)=(1,1) or (2,2), co-phasing values from {j,−j} may be allowed; and for beam selection (i, j)=(1,2),(2,1), co-phasing values from {1,−1} may be allowed. For k=2, for beam selection (i, j)=(1,2) or (2,1), co-phasing values from {j,−j} may be allowed; and for beam selection (i, j)=(1,1), (2,2), co-phasing values from {1,−1} may be allowed. Accordingly, one bit saving may be achieved for signaling on $W_2$.

To support the same rank 1 precoders as from Rel-15 DL 4Tx codebook, a CSR may be taken. Specifically, beam selection (i, j) may be limited to (1,1), (2,2). For instance, (1,2) and (2,1) may not be allowed.

At a base station/network node, as the antenna form factor is less an issue than that at a UE, typically ULA is assumed for antennas/antenna elements for one polarization, and a two-dimensional (2D) array of cross-pol antenna pairs is often assumed as in frequency division multiple-input-and-multiple-output (FD-MIMO).

Figure 6:
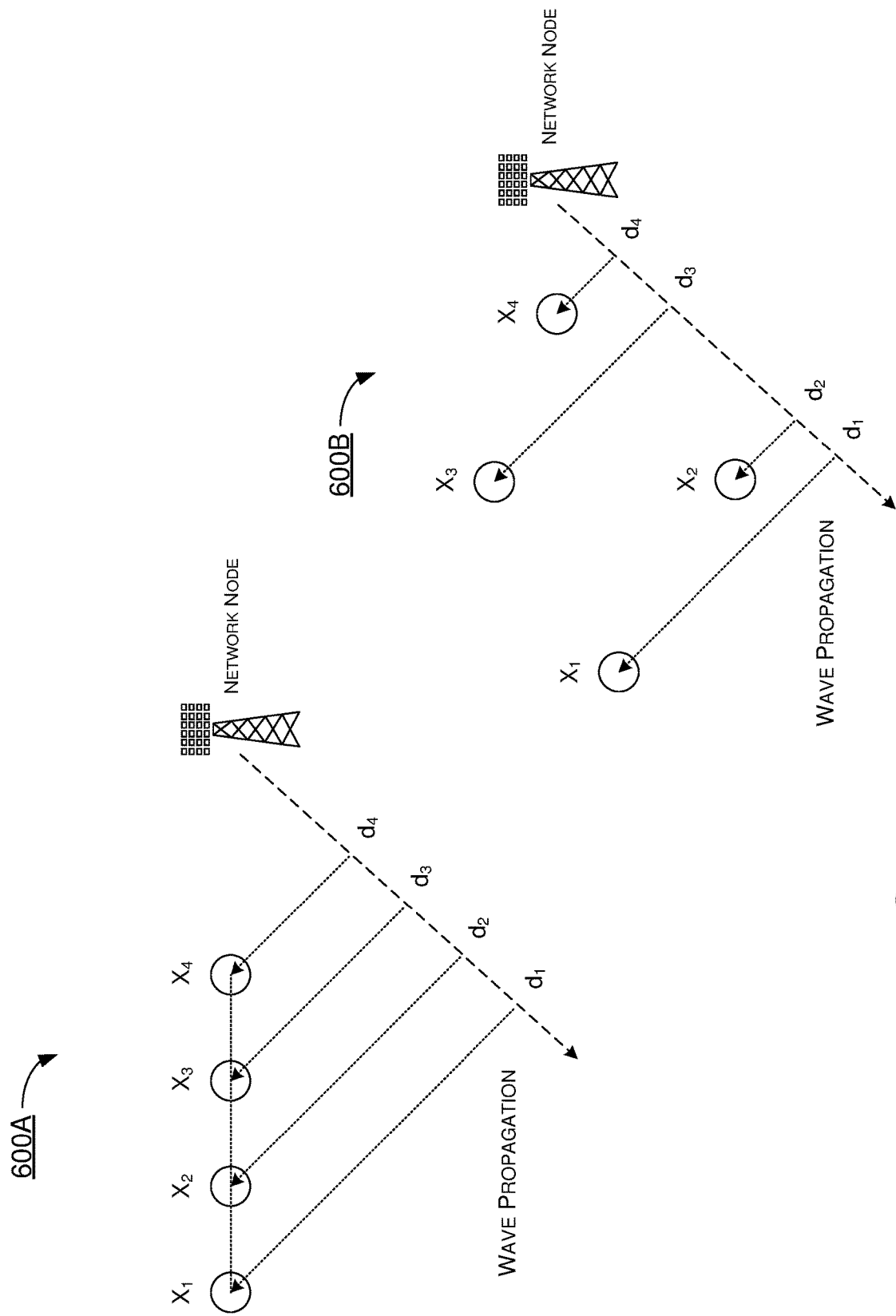
FIG. 6 is a diagram of example scenarios in accordance with the present disclosure.

FIG. 6 illustrates example scenarios 600A and 600B in accordance with the present disclosure. Referring to FIG. 6, scenario 600A depicts an example ULA response, where a signal emitting from a signal source impinges a uniform linear array. The signal model is formulated for receive as often used in array signal processing. The signal model for transmit can be formulated similarly. The phase difference among receivers $x_i$, $1 \leq i \leq N$, may be determined by the projections $d_i$ of antenna positions to the wave propagation direction. The array response vector may be determined by the phase profile $d_1$, $d_2$, $\Lambda$ and $d_N$:

$$P(d_1, d_2, \Lambda, d_N) = \begin{bmatrix} e^{j2\pi \frac{d_1-d_1}{\lambda}} \\ e^{j2\pi \frac{d_2-d_1}{\lambda}} \\ M \\ e^{j2\pi \frac{d_N-d_1}{\lambda}} \end{bmatrix}$$

In the case of ULA, as $d_i$ has a uniform difference (e.g., $d_{i+1}-d_i=\Delta$, with $\Delta$ being the antenna spacing), the phase difference is also uniform. DFT beams may be used to match the phase difference. Thus, high-gain coherent transmissions and receptions may be achieved.

However, at the UE side, an irregular antenna placement may arise as shown in scenario 600B. In general, the differences between neighboring projections $d_i$ may be non-uniform, and it may be difficult to use any DFT beam to approximate $P(d_1,d_2,\Lambda,d_N)$ directly. Yet, the phase profile may be better approximated by re-arranging $d_1$, $d_2$, $\Lambda$ and $d_N$. For example, for a particular antenna placement, it may be possible to approximate $P(d_N,d_1,d_2,\Lambda,d_{N-1})$ well with a DFT beam while $P(d_1,d_2,\Lambda,d_N)$ is not well approximated by any DFT beam. In other words, a premutation of the antenna ports in this case may be helpful.

Starting with a first codebook (e.g., a dual-stage codebook):

$$\frac{1}{\sqrt{8}} W_1^{(k)} W_2^{(m)},$$

where k is a generic index (e.g., $k=(i_{1,1},i_{1,2},i_{1,3})$), m is a generic index (e.g., $m=(i_2)$), and $i_{1,1},i_{1,2},i_{1,3},i_2$ as in TS 38.214 (V.0.1.2 September 2017), then an enlarged codebook may be constructed through $$\frac{1}{\sqrt{8}} \Pi_p W_1^{(k)} W_2^{(m)}$$

where $1 \leq p \leq P$, and $\Pi_p$ is a permutation matrix.

It is noteworthy that the enlarged codebook has P times as many codewords as the first codebook. In the present disclosure, the procedure that generates a second codebook from a first codebook may be referred to as "port permutation."

In an event that targeted irregular antenna placements are known, it may be possible to identify the required port permutations. As there may be many different antenna placements at UEs, one criterion may be used to identify the shuffling parameters (instead of identifying port permutations for specific antenna placements). Under a proposed scheme in accordance with the present disclosure, the larger codebook resulted from port permutation may cover as many entries as possible from Rel-8 DL codebook design and Rel-15 NR DL codebook design as well as the MUB extension from Rel-10 UL codebook. It is also desirable to use port permutations as few times as possible to cover the codewords of reference codebooks (e.g., Rel-8, Rel-10, Rel-15 codebooks) as the number of port permutations directly contributes to the signaling overhead in the UL DCI.

With port permutations, the design space includes two parts: (1) the choice of the first codebook and (2) the choice of port permutations. Accordingly, two constructions ("Construction A" and "Construction B") as shown in the table below may be provided.

| First Codebook | | Port Permutations | Number of Codewords |
|---|---|---|---|
| Construction A | NR Rel-15 DL 4Tx codebook | (1234), (1243), (1324), (1423) | 128 |
| Construction B | Variation of NR Rel-15 DL 4Tx codebook | (1234), (1324) | 64 |

Figure 7:
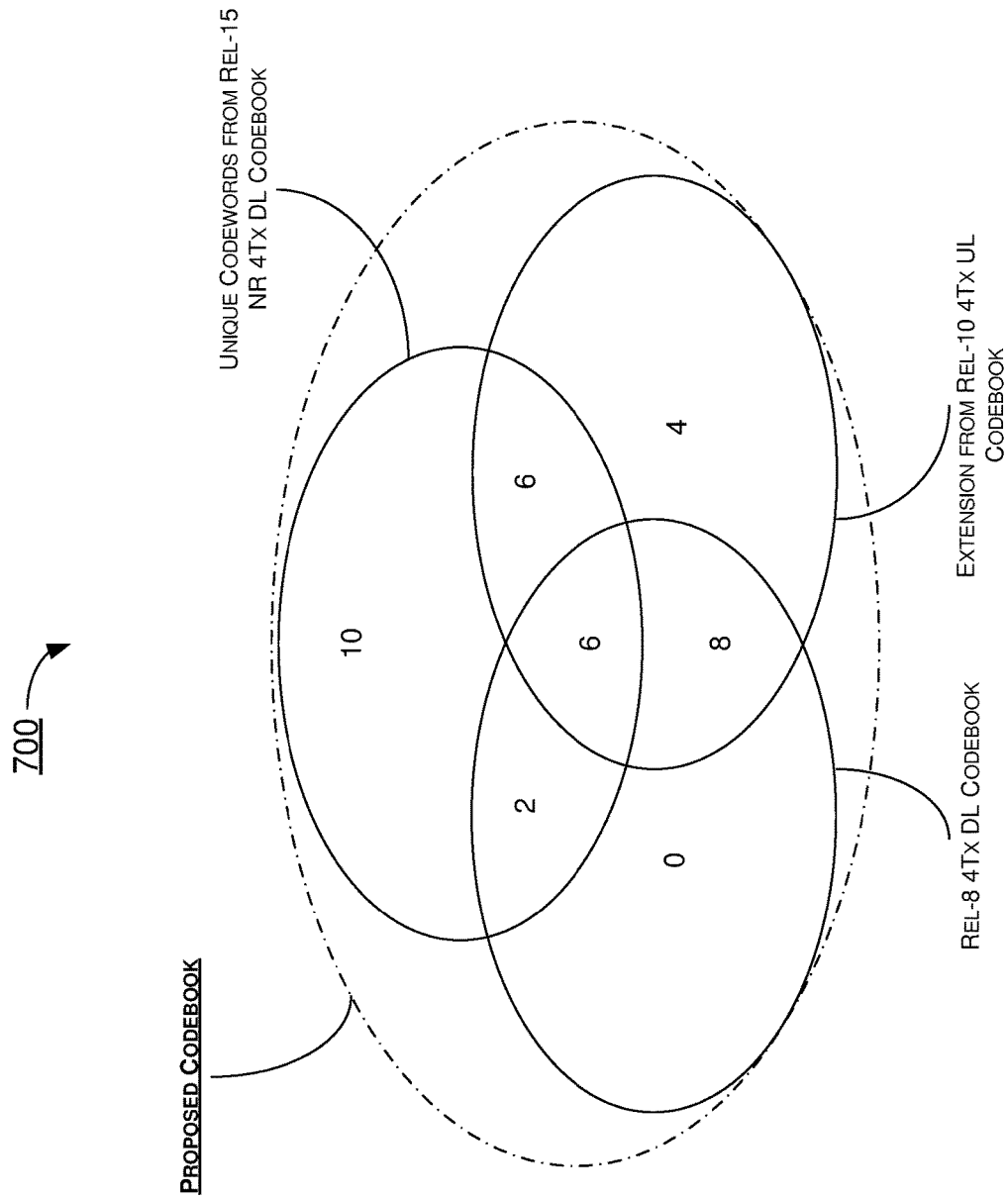
FIG. 7 is a diagram of a proposed rank 2 codebook design in accordance with the present disclosure.

FIG. 7 illustrates a proposed rank 2 codebook design 700 in accordance with the present disclosure. Referring to FIG. 7, either Construction A or Construction B covers Rel-8 4Tx DL codebook, extension from Rel-10 4Tx UL codebook and Rel-15 4Tx DL codebook.

With respect to Construction A, starting with NR Rel-15 4Tx DL codebook with L=1, port permutations (1243), (1324), (1423) besides (1234) for the original codebook may be used to obtain an enlarged codebook with 128 codewords. The constructed codebook covers all codewords from Rel-15 4Tx DL codebook, Rel-8 4Tx codebook and Rel-10 UL 4Tx codebook. With respect to Construction B, the first codebook may be based on beam vector combination design, and the enlarged codebook may be based on the use of permutation matrices. In total 64 codewords may be present in the enlarged codebook. It can be verified that Rel-8 DL 4Tx rank 2 codebook, rank 2 MUB extension from Rel-10 UL 4Tx rank 1 codebook and Rel-15 DL NR 4Tx rank 2 codebook are completely covered by the designed codebooks.

For rank 2 under Construction A, with the NR DL 4Tx codebook with L=1, the following permutation matrices may be applied:

$$\Pi_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

denoted as permutation (1234), $$\Pi_2 = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$$

denoted as permutation (1243), $$\Pi_3 = \begin{bmatrix} 1 & 0 & 0 & 0 \\ 0 & 0 & 1 & 0 \\ 0 & 1 & 0 & 0 \\ 0 & 0 & 0 & 1 \end{bmatrix},$$

denoted as permutation (1324), $$\Pi_4 = \begin{bmatrix} 1 & 0 & 0 & 0 \\ 0 & 0 & 0 & 1 \\ 0 & 1 & 0 & 0 \\ 0 & 0 & 1 & 0 \end{bmatrix}$$

denoted as permutation (1423).

$$\text{Let } u_m = \begin{bmatrix} 1 \\ e^{j\frac{2\pi m}{O_1 N_1}} \end{bmatrix},$$

$$B_k = \begin{bmatrix} u_k & u_{k+\frac{O_1 N_1}{2}} \end{bmatrix}$$

$$W_k^{(1)} = \begin{bmatrix} B_k & \\ & B_k \end{bmatrix}, 0 \le k \le N_1 O_1 - 1$$

$$W_n^{(2)} \in \left\{ \begin{bmatrix} e_1 & e_1 \\ \phi e_1 & -\phi e_1 \end{bmatrix}, \begin{bmatrix} e_1 & e_1 \\ \phi e_1 & -\phi e_2 \end{bmatrix}, \phi = 1, j. \right\}$$

Moreover, $$\frac{1}{\sqrt{8}} \Pi_p W_k^{(1)} W_n^{(2)}$$

may be used to generate 128 rank 2 codewords, p=1, 2, 3, 4, $0 \le k \le N_1 O_1 - 1$, n=1,2.

For rank 2 under Construction B, let $N_1=2$, $N_2=1$ and $O_1=4$. The following may be used to generate 64 codewords:

$$\frac{1}{\sqrt{8}} \Pi_p W_k^{(1)} W_n^{(2)},$$

$0 \le k \le N_1 O_1 - 1$

Here, $P_p$ with p=1,2 may be given by:

$$\Pi_1 = \begin{bmatrix} 1 & & & \\ & 1 & & \\ & & 1 & \\ & & & 1 \end{bmatrix},$$

$$\Pi_2 = \begin{bmatrix} 1 & 0 & 0 & 0 \\ 0 & 0 & 1 & 0 \\ 0 & 1 & 0 & 0 \\ 0 & 0 & 0 & 1 \end{bmatrix}.$$

The definition of $W_k^{(1)}$ may be the same as in NR DL 4Tx codebook.

$$\text{Let } u_m = \begin{bmatrix} 1 \\ e^{j\frac{2\pi m}{O_1 N_1}} \end{bmatrix},$$

$$B_k = \begin{bmatrix} u_k & u_{k+\frac{O_1 N_1}{2}} \end{bmatrix}$$

$$W_k^{(1)} = \begin{bmatrix} B_k & \\ & B_k \end{bmatrix}, 0 \le k \le N_1 O_1 - 1.$$

Two alternatives for $W_n^{(2)}$ may be provided as a first alternative (Alt 1) and a second alternative (Alt 2) as follows:

$$Alt\ 1\ W_n^{(2)} \in \left\{ \begin{bmatrix} e_1 & e_1 \\ e_1 & -e_1 \end{bmatrix}, \begin{bmatrix} e_1 & e_2 \\ \phi e_1 & -\phi e_2 \end{bmatrix}, \begin{bmatrix} e_1 & e_1 \\ e_2 & -e_2 \end{bmatrix}, \phi = 1, j. \right\}$$

$$Alt\ 2\ W_n^{(2)} \in \left\{ \begin{bmatrix} e_1 & e_1 \\ e_1 & -e_1 \end{bmatrix}, \begin{bmatrix} e_1 & e_2 \\ e_1 & -e_2 \end{bmatrix}, \begin{bmatrix} e_1 & e_1 \\ e_2 & -e_2 \end{bmatrix}, \begin{bmatrix} e_1 & e_1 \\ e_2 & -e_1 \end{bmatrix} \right\} \text{ or }$$

$$W_n^{(2)} \in \left\{ \begin{bmatrix} e_1 & e_{1+i_{2,2}} \\ e_{1+i_{2,1}} & -e_{1+\alpha(i_{2,1},i_{2,2})} \end{bmatrix}, \right.$$

$$\left. \alpha(i_{2,1}, i_{2,2}) = \mod(i_{2,1} + i_{2,2}, 2), 0 \le i_{2,1}, i_{2,2} \le 1 \right\}$$

It is noteworthy that it is unnecessary to include both $$\begin{bmatrix} e_1 & e_1 \\ e_1 & -e_1 \end{bmatrix} \text{ and } \begin{bmatrix} e_1 & e_1 \\ je_1 & -je_1 \end{bmatrix}$$

for $W_n^{(2)}$ as they generate chordal-distance equivalent codewords, and either one is sufficient. Also, it is unnecessary to include both $$\begin{bmatrix} e_1 & e_1 \\ e_2 & -e_2 \end{bmatrix} \text{ and } \begin{bmatrix} e_1 & e_1 \\ je_2 & -je_2 \end{bmatrix}$$

for $W_n^{(2)}$ as they generate chordal-distance equivalent codewords.

The aggregation of SRS resources along with PMI(s) may be used to indicate the wideband or subband precoders for UL transmissions. For instance, SRS resources 1, 2, 3 and 4 may be aggregated to be used together with a 4Tx codebook. A single implicit mapping from those SRS resources to codebook antenna ports may be assumed. In view of the above, it may not be sufficient to assume a single order for SRS resources to provide good support to diverse antenna placement scenarios.

Under a proposed scheme in accordance with the present disclosure, there may be a number of approaches to provide specification support for the codebook through port permutations, as described below.

Figure 8:
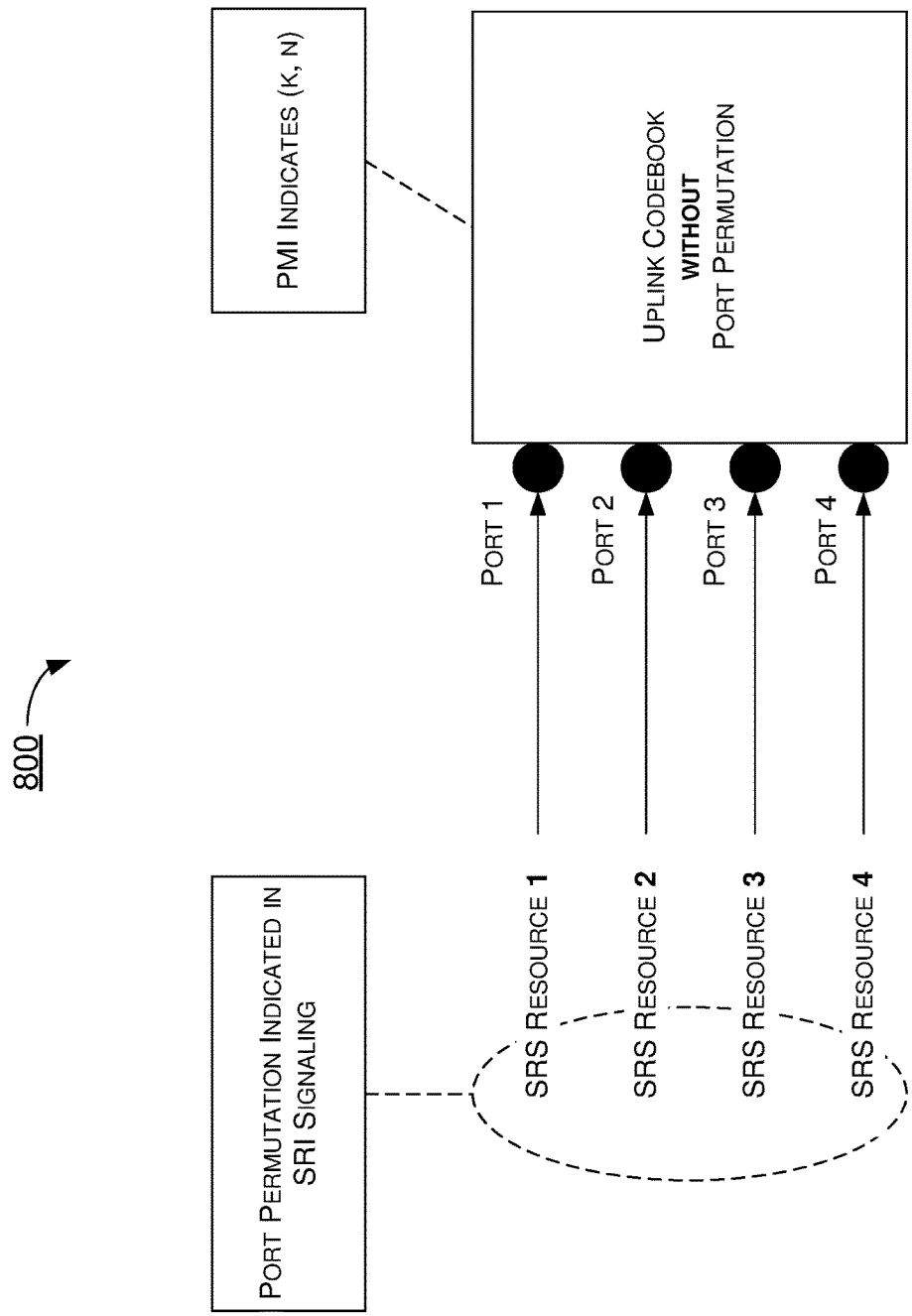
FIG. 8 is a diagram of an example scenario in accordance with the present disclosure.
Figure 9:
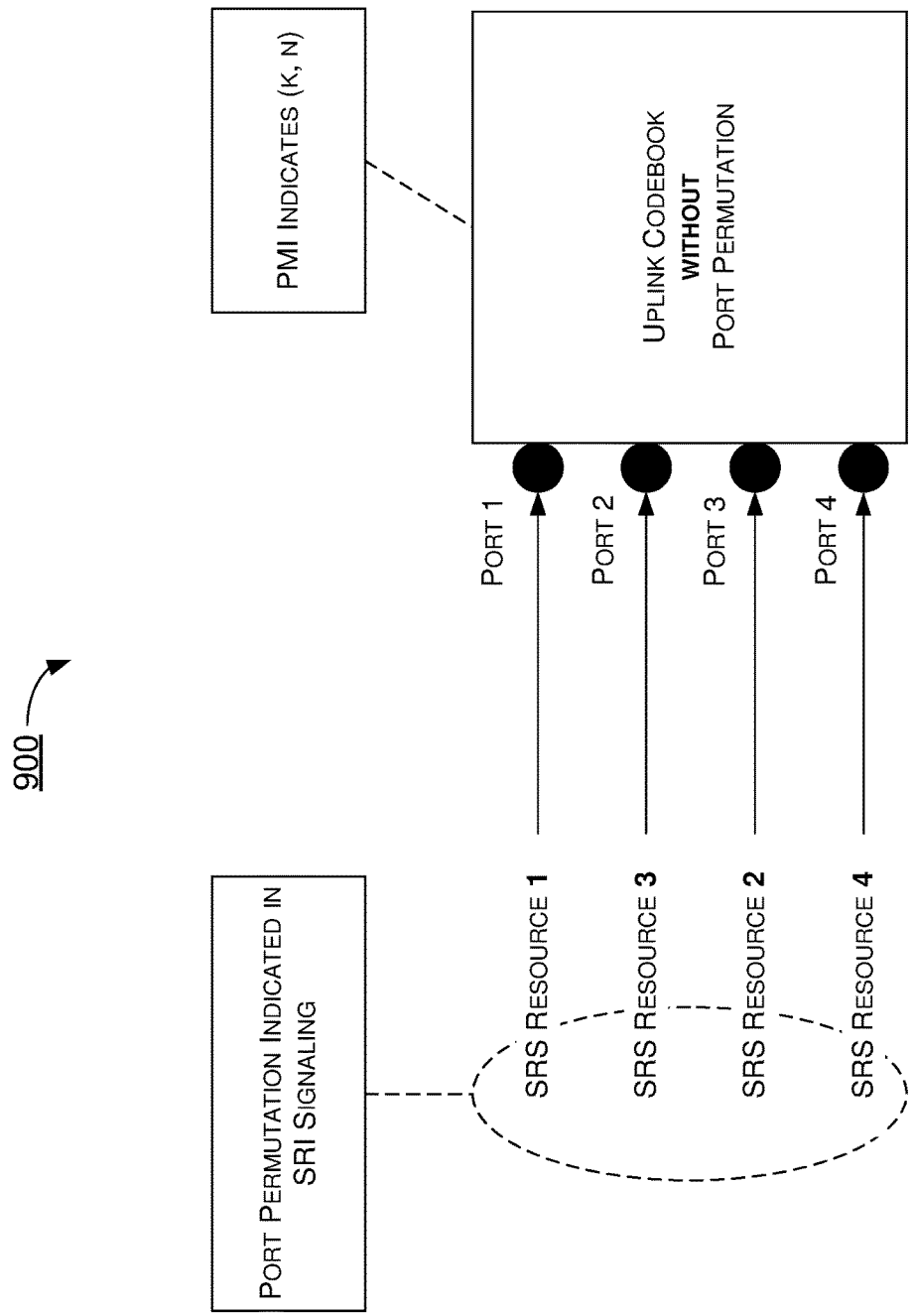
FIG. 9 is a diagram of an example scenario in accordance with the present disclosure.

Under a first approach, in an event that SRS resources with a single port for each SRS resource are used for an UL codebook, with the order of SRS resources mapped to the codebook ports being indicated to a UE, then it may be sufficient to use the first codebook (and no other codebooks) for PMI definition. For example, the network node (e.g., gNB) may indicate that SRS resources 1, 2, 3 and 4 are used for a signaled PMI. In one case the network node may signal that SRS resources 1, 2, 3 and 4 are mapped to ports 1, 2 3 and 4 (e.g., through the signaling of a list of SRIs or index to that list: (1, 2, 3, 4)). In another case, the network node may signal that SRS resources 1, 3, 2 and 4 are mapped to ports 1, 2, 3 and 4 (e.g., through the signaling of a list of SRIs or index to that list: (1, 3, 2, 4)). Two illustrative examples are depicted in FIG. 8 and FIG. 9. FIG. 8 illustrates an example scenario 800 of port permutation (1234) indication from SRI signaling. FIG. 9 illustrates an example scenario 900 of port permutation (1324) indication from SRI signaling.

Figure 10:
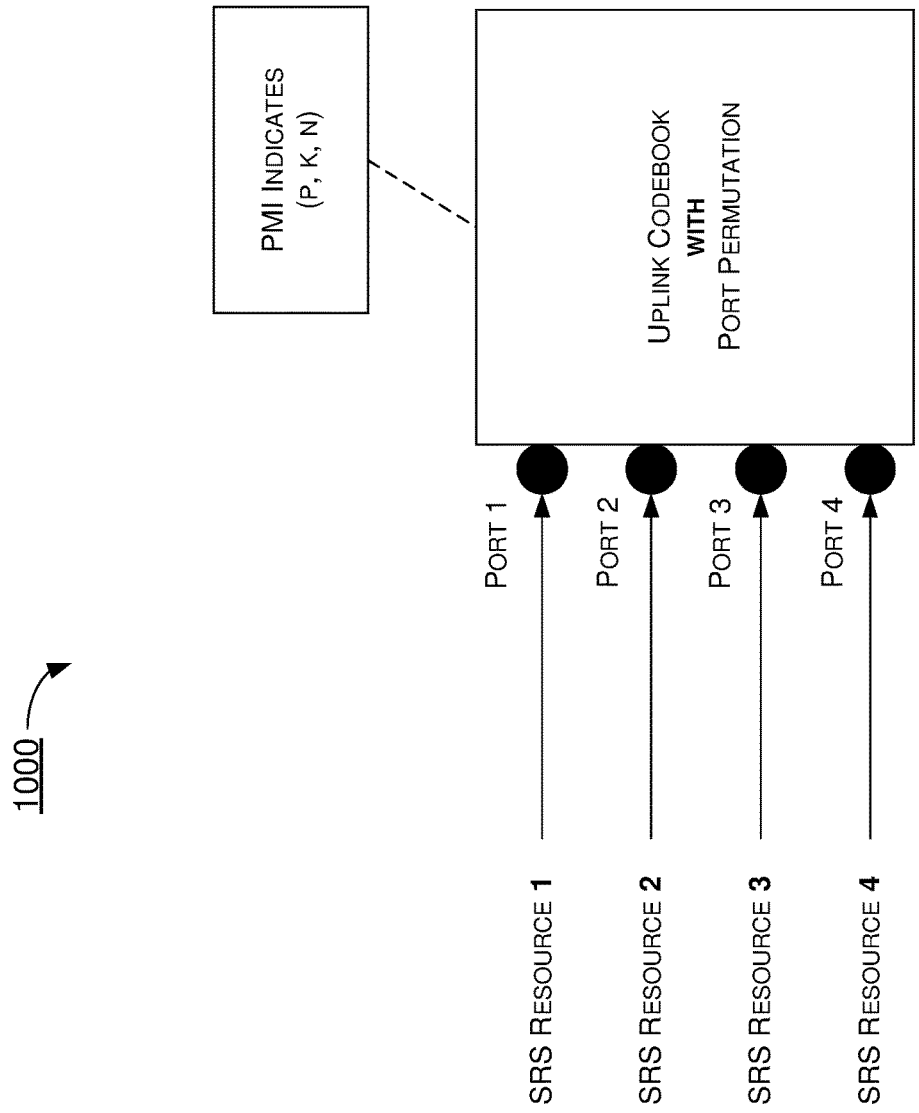
FIG. 10 is a diagram of an example scenario in accordance with the present disclosure.

Under a second approach, in an event that SRS resources with a single port for each SRS resource are used for an UL codebook, with the order of SRS resources mapped to the codebook ports being fixed, then indication of the permutation of the SRS resources may be necessary for PMI definition. For example, the network node (e.g., gNB) may indicate that SRS resources 1, 2, 3 and 4 are used for the signaled PMI. In one design option, the network node may signal the permutation of SRS resources (e.g., (1, 2, 3, 4) or (1, 3, 2, 4) to the UE), and the PMI may be for the first codebook. In another design option, as shown in FIG. 10, the permutation may be integrated in the PMI definition, and the PMI may be for the second codebook. FIG. 10 illustrates an example scenario 1000 of port permutation as an integral part of the codebook definition.

Under a third approach, in an event that a single SRS resource with multiple ports is used for an UL codebook, indication of the permutation of SRS ports may be necessary for PMI definition. For example, the network node (e.g., gNB) may indicate an SRS resource with ports 1, 2, 3 and 4 for a signaled PMI. In one design option, the network node may signal the permutation of SRS ports (e.g., (1, 2, 3, 4) or (1, 3, 2, 4) to the UE), and the PMI may be for the first codebook. In another design option, the permutation of SRS ports may be integrated in the PMI definition, and the PMI may be for the second codebook.

Under the proposed scheme, a single UE may not need all possible permutations at once since some limited SRS resource/port combinations or permutations (e.g., (1, 2, 3, 4) or (1, 3, 2, 4)) may be configured through RRC signaling or MAC IE. For instance, a base station may dynamically signal to a UE an index to the SRI permutations in the UL DCI. The index may be linked to an SRS resource/port permutation.

In an event that port permutation takes place within one SRS resource, a similar index can be also used to reduce signaling overhead. For instance, as the enlarged codebook supports four permutations and assuming the base station decides two are enough (e.g., in Construction A, (1, 2, 3, 4) and (1, 3, 2, 4)), the base station may indicate to the UE (e.g., in RRC signaling and/or MAC CE) that only two permutations (in the example (1, 2, 3, 4) and (1, 3, 2, 4)) are used. Advantageously, the signaling overhead for port permutations may be reduced from 2 bits to 1 bit. In general, an index in the DCI/MAC CE pointing to SRI combination (not limited to the permutation case considered here) rather than an enumeration of SRIs may be an effective way to reduce signaling overhead.

In view of the above, since the number of codewords in Construction B described above is limited (to 64), Construction B may be a more reasonable choice between Construction A and Construction B to be adopted for NR UL 4Tx rank 2 codebook.

Codebook Subset Restriction

Under a proposed scheme in accordance with the present disclosure, for UL codebook-based transmissions with one SRS resource and a given number of SRS ports, overhead reduction for TPMI and TPMI-related signaling may be achieved. A number of cases are described below.

In a first case ("case 1"), with no coherence among Tx chains, two ports out of four ports may be chosen for rank 2 transmission.

In a second case ("case 2"), rank 2 transmission may come from the same coherence group. In this case, the two-transmitter (2Tx) codebook for rank 2 may be applied. As there are two ways to select a coherence group, there are two ways to choose a rank 2 2Tx precoder (assuming the same construction for 2Tx UL codebook).

In a third case ("case 3"), the AGI issue may arise even with full coherence. Hence, port selection may be over all four ports instead of being limited to ports in the same coherence group as in case 2. It is noteworthy that in counting the number of code states, double counting is avoided by discarding the precoders already covered in case 3. That is, 6 (the total combinations under case 3)−2 (the total combinations under case 2)×2 (the number of rank 2 Tx precoders)=8.

In a fourth case ("case 4"), one spatial layer transmission may come from coherence group 1, with another spatial layer group from coherence group 2. Hence, rank 1 precoders over 2Tx may be used over each coherence group. Following the design for the 2Tx codebook, there may be six rank 1 precoders, and so there are 6×6 ways to pair up precoders over two coherence groups. Here, four precoders already covered in case 1 are excluded.

In a fifth case ("case 5"), for full coherence, in the calculation below, if the Rel-8 4Tx codebook is used then there are 16 entries.

In total, there may be 66 code states for the 4Tx rank 2 transmission. In an event that no codebook subset restriction (CSR) is applied, or even if applied but not reflected in the DL signaling, then ceil(log 2(66))=6 bits are required for TPMI signaling. The table below summarizes the five cases described above. In the table, "CAG" denotes coherence antenna group, "4 CAGs" denotes no coherence, "1 CAG" denotes full coherence, "2 CAGs" denotes partial coherence with ports 1 and 2 forming one coherence group and ports 3 and 4 forming another coherence group.

|  | TRI Value | Port Selection | # of Precoders at Selected Ports | # of Code States | Notes |
| --- | --- | --- | --- | --- | --- |
| Case 1 | 4 CAGs | 2 | nchoosek (4, 2) | 1 | 6 |  |
| Case 2 | 2 CAGs (2, 0) | 2 | 2 | 2 | 4 | Identity matrix is covered by 4 CAGs |
| Case 3 | AGI | 2 | nchoosek (4, 2) | 2 | 8 | Exclude 2 combinations covered by 2 CAGs (2, 0) |

|  | TRI Value | Port Selection | # of Precoders at Selected Ports | # of Code States | Notes |
|---|---|---|---|---|---|
| Case 4 | 2 CAGs (1, 1) | 2 | 1 | 6 × 6 − 4 | 32 | {[1 0], [0 1]} × {[1 0], [0 1]}) is covered by 4 CAGs |
| Case 5 | 1 CAG | 2 | 1 | 16 | 16 | |
| Total |  |  |  |  | 66 | |

Thus, CSR according to coherence group may provide saving. For example, with one coherence group without the AGI issue (e.g., case 5), then ceil(log 2(16))=4 bits would be needed. Advantageously, 3 bits can be saved compared to the case with a fixed TPMI size of 7 bits. With one coherence group and the AGI issue (e.g., case 5 plus case 3), then ceil(log 2(16+8))=5 bits would be needed. Advantageously, 2 bits can be saved compared to the case with a fixed TPMI size of 7 bits.

For case 5, in an event that the dual-stage codebook as proposed in the present disclosure is utilized instead of the Rel-8 4Tx codebook, the base station may select useful codewords accordingly. As described above, the proposed dual-stage codebook may include codewords for ULA and non-ULA antenna configurations. The base station may settle with one group (e.g., codewords for ULA) to reduce the signaling overhead. In this case, CSR may become a very useful tool to reconcile two somewhat conflicting design goals, namely: (1) having as many codewords as possible to cover diverse scenarios, and (2) having as few codewords as possible to minimize PMI-related signaling overhead. Considering the benefits provided by CSR, it would be advantageous for the base station to have flexibility in deciding what codewords can be used for UL MIMO. Thus, under the proposed scheme, a base station may be capable of signaling to a UE a codebook subset restriction with a bitmap for an UL codebook through RRC signaling. The length of the bitmap may be equal to a number of precoders in the codebook.

Illustrative Implementations

Figure 11:
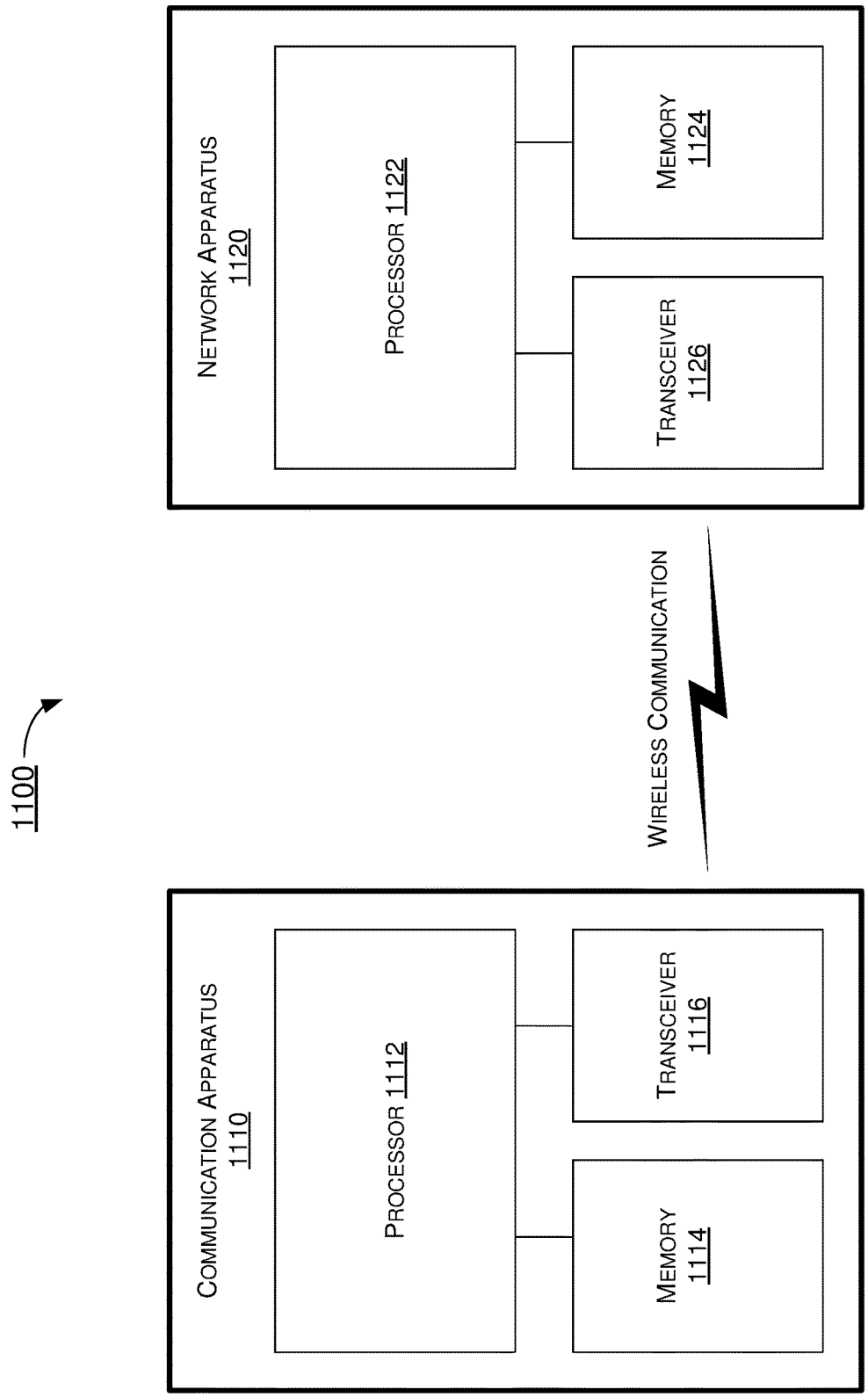
FIG. 11 is a diagram of an example wireless communication environment in accordance with an implementation of the present disclosure.

FIG. 11 illustrates an example wireless communication environment 1100 in accordance with an implementation of the present disclosure. Wireless communication environment 1100 may involve a communication apparatus 1110 and a network apparatus 1120 in wireless communication with each other. Each of communication apparatus 1110 and network apparatus 1120 may perform various functions to implement procedures, schemes, techniques, processes and methods described herein pertaining to codebook-based uplink transmission in wireless communications, including the various procedures, scenarios, schemes, solutions, concepts and techniques described above as well as process 1200 described below. Thus, communication apparatus 1110 may be an example implementation of UE 110 in procedure 100, and network apparatus 1120 may be an example implementation of network node 120 in procedure 100.

Communication apparatus 1110 may be a part of an electronic apparatus, which may be a UE such as a portable or mobile apparatus, a wearable apparatus, a wireless communication apparatus or a computing apparatus. For instance, communication apparatus 1110 may be implemented in a smartphone, a smartwatch, a personal digital assistant, a digital camera, or a computing equipment such as a tablet computer, a laptop computer or a notebook computer. Moreover, communication apparatus 1110 may also be a part of a machine type apparatus, which may be an IoT or NB-IoT apparatus such as an immobile or a stationary apparatus, a home apparatus, a wire communication apparatus or a computing apparatus. For instance, communication apparatus 1110 may be implemented in a smart thermostat, a smart fridge, a smart door lock, a wireless speaker or a home control center. Alternatively, communication apparatus 1110 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Communication apparatus 1110 may include at least some of those components shown in FIG. 11 such as a processor 1112, for example. Communication apparatus 1110 may further include one or more other components not pertinent to the proposed scheme of the present disclosure (e.g., internal power supply, display device and/or user interface device), and, thus, such component(s) of communication apparatus 1110 are neither shown in FIG. 11 nor described below in the interest of simplicity and brevity.

Network apparatus 1120 may be a part of an electronic apparatus, which may be a network node such as a TRP, a base station, a small cell, a router or a gateway. For instance, network apparatus 1120 may be implemented in an eNodeB in an LTE, LTE-Advanced or LTE-Advanced Pro network or in a gNB in a 5G, NR, IoT or NB-IoT network. Alternatively, network apparatus 1120 may be implemented in the form of one or more IC chips such as, for example and without limitation, one or more single-core processors, one or more multi-core processors, one or more RISC processors, or one or more CISC processors.

Network apparatus 1120 may include at least some of those components shown in FIG. 11 such as a processor 1122, for example. Network apparatus 1120 may further include one or more other components not pertinent to the proposed scheme of the present disclosure (e.g., internal power supply, display device and/or user interface device), and, thus, such component(s) of network apparatus 1120 are neither shown in FIG. 11 nor described below in the interest of simplicity and brevity.

In one aspect, each of processor 1112 and processor 1122 may be implemented in the form of one or more single-core processors, one or more multi-core processors, one or more RISC processors, or one or more CISC processors. That is, even though a singular term "a processor" is used herein to refer to processor 1112 and processor 1122, each of processor 1112 and processor 1122 may include multiple processors in some implementations and a single processor in other implementations in accordance with the present disclosure. In another aspect, each of processor 1112 and processor 1122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1112 and processor 1122 is a special-purpose machine specifically designed, arranged and configured to perform specific tasks pertaining to codebook-based uplink transmission in wireless communications in accordance with various implementations of the present disclosure.

In some implementations, communication apparatus 1110 may also include a transceiver 1116 coupled to processor 1112 and capable of wirelessly transmitting and receiving data, signals and information. In some implementations, transceiver 1116 may be equipped with a plurality of antenna ports (not shown) such as, for example, four antenna ports. In some implementations, communication apparatus 1110 may further include a memory 1114 coupled to processor 1112 and capable of being accessed by processor 1112 and storing data therein. In some implementations, network apparatus 1120 may also include a transceiver 1126 coupled to processor 1122 and capable of wirelessly transmitting and receiving data, signals and information. In some implementations, network apparatus 1120 may further include a memory 1124 coupled to processor 1122 and capable of being accessed by processor 1122 and storing data therein. Accordingly, communication apparatus 1110 and network apparatus 1120 may wirelessly communicate with each other via transceiver 1116 and transceiver 1126, respectively.

To aid better understanding, the following description of the operations, functionalities and capabilities of each of communication apparatus 1110 and network apparatus 1120 is provided in the context of a mobile communication environment in which communication apparatus 1110 is implemented in or as a communication apparatus or a UE and network apparatus 1120 is implemented in or as a network node (e.g., gNB or TRP) of a wireless network (e.g., 5G/NR mobile network).

Under various proposed schemes in accordance with the present disclosure, processor 1112 of communication apparatus 1110 may store, in memory 1114, information with respect to a plurality of permutations with respect to a mapping between a plurality of SRS resources and a plurality of antenna ports at communication apparatus 1110. Moreover, processor 1112 may receive, via transceiver 1116, signaling from network apparatus 1120. The signaling may contain an index identifying a permutation among the plurality of permutations. Furthermore, processor 1112 may perform, via transceiver 1116, an uplink transmission of data to network apparatus 1120 using one or more SRS resources of the plurality of SRS resources and one or more antenna ports of the plurality of antenna ports according to the identified permutation.

In some implementations, the index may include one or more binary bits. In some implementations, a quantity of the one or more binary bits may correspond to a number of permutations of the plurality of permutations that are available. For instance, when the number of permutations of the plurality of permutations that are available is 2, the index may include 1 bit. Moreover, when the number of permutations of the plurality of permutations that are available is 4, the index may include 2 bits.

In some implementations, in receiving the signaling processor 1112 may receive an RRC signal or an MAC CE.

In some implementations, in receiving the signaling processor 1112 may receive UL DCI.

In some implementations, processor 1112 may construct a codebook comprising a plurality of precoders. Moreover, processor 1112 may process the data using the codebook prior to performing the uplink transmission of the data. In some implementations, in constructing the codebook, processor 1112 may select a candidate precoder from a single-stage codebook or a dual-stage codebook and performing a permutation on the candidate precoder.

In some implementations, in performing the permutation on the candidate precoder processor 1112 may perform a plurality of permutations on the candidate precoder to construct the codebook. In some implementations, the plurality of permutations may cover a plurality of mutually unbiased bases, a plurality of codebooks specified in 3GPP specifications, or a combination thereof.

In some implementations, in constructing the codebook processor 1112 may select an original codebook from a plurality of codebooks specified in 3GPP specifications. Moreover, processor 1112 may enlarge the original codebook by performing one or more permutations on the original codebook with one or more permutation matrices to obtain the codebook. In some implementations, a feedback overhead of the codebook may remain unchanged compared to a feedback overhead of the original codebook.

In some implementations, in performing the permutation on the candidate precoder processor 1112 may select a permutation matrix from a plurality of permutation matrices. Additionally, processor 1112 may apply the permutation matrix to the candidate precoder to enlarge the candidate precoder.

In some implementations, in selecting the permutation matrix processor 1112 may dynamically or semi-statically receive signaling from network apparatus 1120 indicating selection of the permutation matrix for constructing the codebook.

In some implementations, in receiving the signaling processor 1112 may receive RRC signaling or an MAC CE as part of codebook subset restriction (CSR) or independent of the CSR.

In some implementations, in selecting the permutation matrix processor 1112 may select the permutation matrix based on an indication that is an integral part of the codebook.

In some implementations, each of the plurality of permutation matrices may correspond to respective one or more antenna placement scenarios or one or more codewords.

In some implementations, the candidate precoder may include a rank 2 precoder.

In some implementations, processor 1112 may receive, via transceiver 1116, further signaling from network apparatus 1120 indicating an order in which the plurality of SRS resources are mapped to the plurality of antenna ports at communication apparatus 1110 for a subsequent uplink transmission.

In some implementations, each of one or more of the antenna ports may be configurable to be mapped to any SRS resource of the plurality of SRS resources for the subsequent uplink transmission using the codebook.

In some implementations, the further signaling may indicate one of the plurality of permutations with respect to the order in which the plurality of SRS resources are mapped to the plurality of antenna ports. In some implementations, the plurality of antenna ports may be fixedly mapped to the plurality of SRS resources for the subsequent uplink transmission using the codebook. In some implementations, the further signaling may include a precoding matrix indicator (PMI), and the one of the plurality of permutations may be an integral part of in a PMI definition with respect to the PMI.

In some implementations, processor 1112 may receive, via transceiver 1116, further signaling from network apparatus 1120 indicating a CSR with respect to the codebook. Moreover, processor 1112 may select, by the processor based on the CSR, one or more codewords in the codebook. In some implementations, in transmitting the processed data to network apparatus 1120 processor 1112 may transmit the processed data to network apparatus 1120 using the one or more codewords.

In some implementations, in receiving the further signaling from network apparatus 1120 indicating the CSR processor 1112 may receive the CSR with a bitmap through RRC signaling. In some implementations, a length of the bitmap may equal a number of precoders in the codebook.

Illustrative Processes

Figure 12:
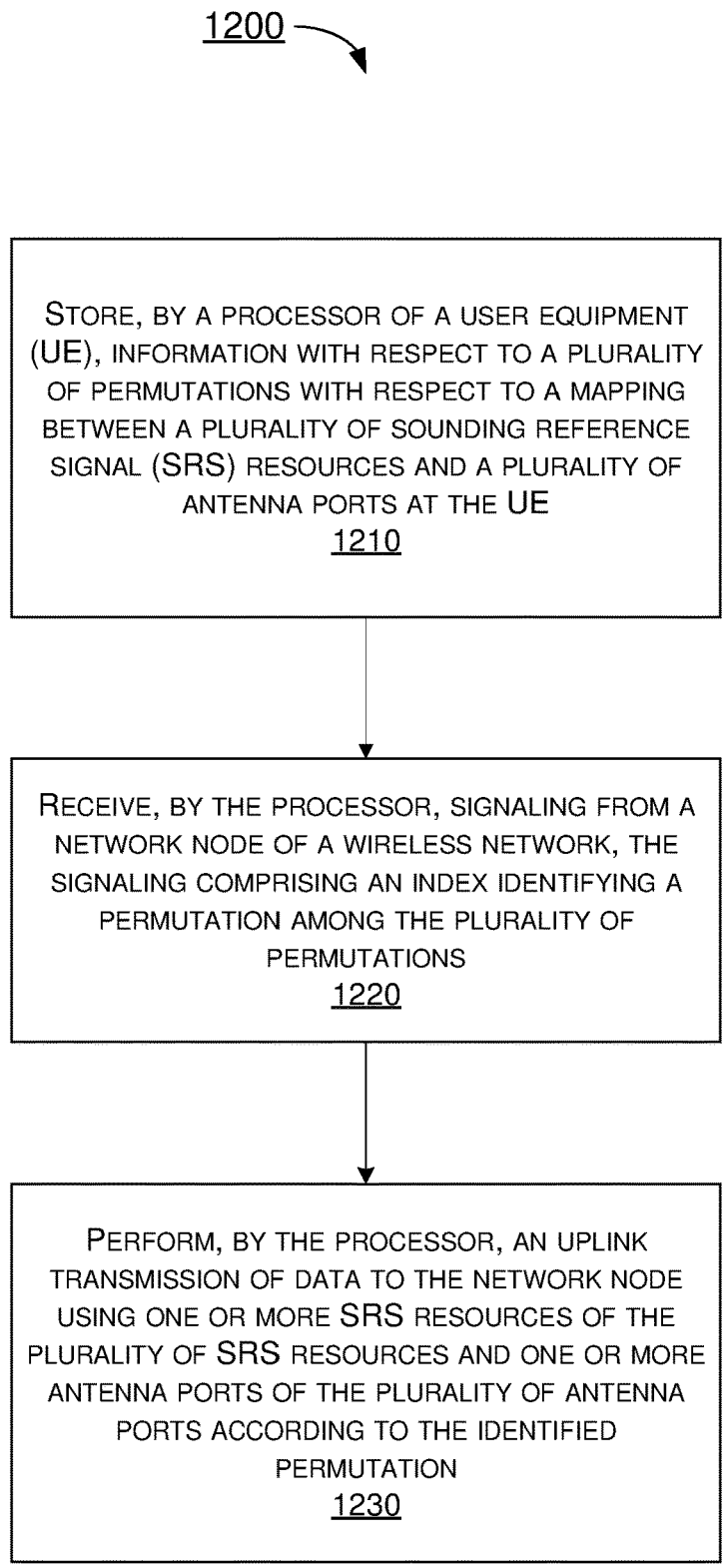
FIG. 12 is a flowchart of an example process in accordance with an implementation of the present disclosure.

FIG. 12 illustrates an example process 1200 in accordance with an implementation of the present disclosure. Process 1200 may be an example implementation of the various procedures, scenarios, schemes, solutions, concepts and techniques, or a combination thereof, whether partially or completely, with respect to codebook-based uplink transmission in wireless communications in accordance with the present disclosure. Process 1200 may represent an aspect of implementation of features of communication apparatus 1110. Process 1200 may include one or more operations, actions, or functions as illustrated by one or more of blocks 1210, 1220 and 1230. Although illustrated as discrete blocks, various blocks of process 1200 may be divided into additional blocks, combined into fewer blocks, or eliminated, depending on the desired implementation. Moreover, the blocks of process 1200 may executed in the order shown in FIG. 12 or, alternatively, in a different order, and one or more of the blocks of process 1200 may be repeated one or more times. Process 1200 may be implemented by communication apparatus 1110 or any suitable UE or machine type devices. Solely for illustrative purposes and without limitation, process 1200 is described below in the context of communication apparatus 1110 as a UE and network apparatus 1120 as a network node (e.g., gNB) of a wireless network. Process 1200 may begin at block 1210.

At 1210, process 1200 may involve processor 1112 of communication apparatus 1110 storing, in memory 1114, information with respect to a plurality of permutations with respect to a mapping between a plurality of SRS resources and a plurality of antenna ports at communication apparatus 1110. Process 1200 may proceed from 1210 to 1220.

At 1220, process 1200 may involve processor 1112 receiving, via transceiver 1116, signaling from network apparatus 1120. The signaling may contain an index identifying a permutation among the plurality of permutations. Process 1200 may proceed from 1220 to 1230.

At 1230, process 1200 may involve processor 1112 performing, via transceiver 1116, an uplink transmission of data to network apparatus 1120 using one or more SRS resources of the plurality of SRS resources and one or more antenna ports of the plurality of antenna ports according to the identified permutation.

In some implementations, the index may include one or more binary bits. In some implementations, a quantity of the one or more binary bits may correspond to a number of permutations of the plurality of permutations that are available. For instance, when the number of permutations of the plurality of permutations that are available is 2, the index may include 1 bit. Moreover, when the number of permutations of the plurality of permutations that are available is 4, the index may include 2 bits.

In some implementations, in receiving the signaling process 1200 may involve processor 1112 receiving an RRC signal or an MAC CE.

In some implementations, in receiving the signaling process 1200 may involve processor 1112 receiving UL DCI.

In some implementations, process 1200 may involve processor 1112 performing additional operations. For instance, process 1200 may involve processor 1112 constructing a codebook comprising a plurality of precoders. Moreover, process 1200 may involve processor 1112 processing the data using the codebook prior to performing the uplink transmission of the data. In some implementations, in constructing the codebook, process 1200 may involve processor 1112 selecting a candidate precoder from a single-stage codebook or a dual-stage codebook and performing a permutation on the candidate precoder.

In some implementations, in performing the permutation on the candidate precoder process 1200 may involve processor 1112 performing a plurality of permutations on the candidate precoder to construct the codebook. In some implementations, the plurality of permutations may cover a plurality of mutually unbiased bases, a plurality of codebooks specified in 3GPP specifications, or a combination thereof.

In some implementations, in constructing the codebook process 1200 may involve processor 1112 performing a number of operations. For instance, process 1200 may involve processor 1112 selecting an original codebook from a plurality of codebooks specified in 3GPP specifications. Moreover, process 1200 may involve processor 1112 enlarging the original codebook by performing one or more permutations on the original codebook with one or more permutation matrices to obtain the codebook. In some implementations, a feedback overhead of the codebook may remain unchanged compared to a feedback overhead of the original codebook.

In some implementations, in performing the permutation on the candidate precoder process 1200 may involve processor 1112 selecting a permutation matrix from a plurality of permutation matrices. Additionally, process 1200 may involve processor 1112 applying the permutation matrix to the candidate precoder to enlarge the candidate precoder.

In some implementations, in selecting the permutation matrix process 1200 may involve processor 1112 dynamically or semi-statically receiving signaling from network apparatus 1120 indicating selection of the permutation matrix for constructing the codebook.

In some implementations, in receiving the signaling process 1200 may involve processor 1112 receiving RRC signaling or an MAC CE as part of CSR or independent of the CSR.

In some implementations, in selecting the permutation matrix process 1200 may involve processor 1112 selecting the permutation matrix based on an indication that is an integral part of the codebook.

In some implementations, each of the plurality of permutation matrices may correspond to respective one or more antenna placement scenarios or one or more codewords.

In some implementations, the candidate precoder may include a rank 2 precoder.

In some implementations, process 1200 may involve processor 1112 performing additional operations. For instance, process 1200 may involve processor 1112 receiving, via transceiver 1116, further signaling from network apparatus 1120 indicating an order in which the plurality of SRS resources are mapped to the plurality of antenna ports at communication apparatus 1110 for a subsequent uplink transmission.

In some implementations, each of one or more of the antenna ports may be configurable to be mapped to any SRS resource of the plurality of SRS resources for the subsequent uplink transmission using the codebook.

In some implementations, the further signaling may indicate one of the plurality of permutations with respect to the order in which the plurality of SRS resources are mapped to the plurality of antenna ports. In some implementations, the plurality of antenna ports may be fixedly mapped to the plurality of SRS resources for the subsequent uplink transmission using the codebook. In some implementations, the further signaling may include a PMI, and the one of the plurality of permutations may be an integral part of in a PMI definition with respect to the PMI.

In some implementations, process 1200 may involve processor 1112 performing additional operations. For instance, process 1200 may involve processor 1112 receiving, via transceiver 1116, further signaling from network apparatus 1120 indicating a CSR with respect to the codebook. Moreover, process 1200 may involve processor 1112 selecting, based on the CSR, one or more codewords in the codebook. In some implementations, in transmitting the processed data to network apparatus 1120 process 1200 may involve processor 1112 transmitting the processed data to network apparatus 1120 using the one or more codewords.

In some implementations, in receiving the further signaling from network apparatus 1120 indicating the CSR process 1200 may involve processor 1112 receiving the CSR with a bitmap through RRC signaling. In some implementations, a length of the bitmap may equal a number of precoders in the codebook.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of codebook-based uplink transmissions in wireless communications, comprising:
    receiving, by a processor of a user equipment (UE), signaling from a network node of a wireless network, the signaling comprising an index identifying a permutation among a plurality of permutations with respect to a mapping between a plurality of sounding reference signal (SRS) resources and a plurality of antenna ports at the UE; and
    performing, by the processor, an uplink transmission of data to the network node using one or more SRS resources of the plurality of SRS resources and one or more antenna ports of the plurality of antenna ports according to the identified permutation,
    wherein the plurality of antenna ports are fixedly mapped to the plurality of SRS resources for the subsequent uplink transmission using the codebook, wherein the further signaling comprises a precoding matrix indicator (PMI), and
wherein the one of the plurality of permutations is an integral part of in a PMI definition with respect to the PMI.

2. The method of claim 1, wherein the index comprises one or more binary bits, and where a quantity of the one or more binary bits corresponds to a number of permutations of the plurality of permutations that are available.

3. The method of claim 2, wherein the number of permutations of the plurality of permutations that are available is 2, and wherein the index comprises 1 bit.

4. The method of claim 2, wherein the number of permutations of the plurality of permutations that are available is 4, and wherein the index comprises 2 bits.

5. The method of claim 1, wherein the receiving of the signaling comprises receiving a radio resource control (RRC) signal or a media access control (MAC) control element (CE).

6. The method of claim 1, wherein the receiving of the signaling comprises receiving uplink (UL) downlink control information (DCI).

7. The method of claim 1, further comprising:
constructing, by the processor, a codebook comprising a plurality of precoders; and
processing, by the processor, the data using the codebook prior to performing the uplink transmission of the data,
wherein the constructing of the codebook comprises:
selecting a candidate precoder from a single-stage codebook or a dual-stage codebook; and
performing a permutation on the candidate precoder.

8. The method of claim 7, wherein the performing of the permutation on the candidate precoder comprises performing a plurality of permutations on the candidate precoder to construct the codebook, and wherein the plurality of permutations cover a plurality of mutually unbiased bases, a plurality of codebooks specified in 3rd-Generation Partnership Project (3GPP) specifications, or a combination thereof.

9. The method of claim 7, wherein the constructing of the codebook comprises:
selecting an original codebook from a plurality of codebooks specified in $3^{rd}$-Generation Partnership Project (3GPP) specifications; and
enlarging the original codebook by performing one or more permutations on the original codebook with one or more permutation matrices to obtain the codebook,
wherein a feedback overhead of the codebook remains unchanged compared to a feedback overhead of the original codebook.

10. The method of claim 7, wherein the performing of the permutation on the candidate precoder comprises:
selecting a permutation matrix from a plurality of permutation matrices; and
applying the permutation matrix to the candidate precoder to enlarge the candidate precoder.

11. The method of claim 10, wherein the selecting of the permutation matrix comprises dynamically or semi-statically receiving signaling from the network node indicating selection of the permutation matrix for constructing the codebook.

12. The method of claim 11, wherein the receiving of the signaling comprises receiving radio resource control (RRC) signaling or a media access control (MAC) control element (CE) as part of codebook subset restriction (CSR) or independent of the CSR.

13. The method of claim 10, wherein the selecting of the permutation matrix comprises selecting the permutation matrix based on an indication that is an integral part of the codebook.

14. The method of claim 10, wherein each of the plurality of permutation matrices corresponds to respective one or more antenna placement scenarios or one or more codewords.

15. The method of claim 7, wherein the candidate precoder comprises a rank 2 precoder.

16. The method of claim 1, wherein each of one or more of the antenna ports is configurable to be mapped to any SRS resource of the plurality of SRS resources for the subsequent uplink transmission using the codebook.

17. The method of claim 7, further comprising:
receiving, by the processor, further signaling from the network node indicating an order in which the plurality of SRS resources are mapped to the plurality of antenna ports at the UE for a subsequent uplkink transmission,
wherein the further signaling indicates one of the plurality of permutations with respect to the order in which the plurality of SRS resources are mapped to the plurality of antenna ports,
wherein the plurality of antenna ports are fixedly mapped to the plurality of SRS resources for the subsequent uplink transmission using the codebook,
wherein the further signaling comprises a precoding matrix indicator (PMI), and
wherein the one of the plurality of permutations is an integral part of in a PMI definition with respect to the PMI.

18. The method of claim 7, further comprising:
receiving, by the processor, further signaling from the network node indicating a codebook subset restriction (CSR) with respect to the codebook; and
selecting, by the processor based on the CSR, one or more codewords in the codebook,
wherein the transmitting of the processed data to the network node comprises transmitting the processed data to the network node using the one or more codewords.

19. The method of claim 18, wherein the receiving of the further signaling from the network node indicating the CSR comprises receiving the CSR with a bitmap through radio resource control (RRC) signaling, and wherein a length of the bitmap equals a number of precoders in the codebook.

* * * * *